(12) United States Patent
Chitrakar et al.

(10) Patent No.: US 12,052,188 B2
(45) Date of Patent: Jul. 30, 2024

(54) TRANSMISSION APPARATUS AND TRANSMISSION METHOD

(71) Applicant: Panasonic Intellectual Property Corporation of America, Torrance, CA (US)

(72) Inventors: Rojan Chitrakar, Singapore (SG); Lei Huang, Singapore (SG); Yoshio Urabe, Nara (JP)

(73) Assignee: Panasonic Intellectual Property Corporation of America, Torrance, CA (US)

(*) Notice: Subject to any disclaimer, the term of this patent is extended or adjusted under 35 U.S.C. 154(b) by 0 days.

(21) Appl. No.: 17/895,924

(22) Filed: Aug. 25, 2022

(65) Prior Publication Data

US 2023/0137420 A1     May 4, 2023

Related U.S. Application Data

(63) Continuation of application No. 17/894,920, filed on Aug. 24, 2022, which is a continuation of application
(Continued)

(30) Foreign Application Priority Data

Jul. 22, 2016   (JP) ................................. 2016-144911

(51) Int. Cl.
    *H04L 5/00*          (2006.01)
    *H04B 7/0452*      (2017.01)
    (Continued)

(52) U.S. Cl.
    CPC .......... *H04L 5/0037* (2013.01); *H04B 7/0452* (2013.01); *H04L 1/188* (2013.01);
    (Continued)

(58) Field of Classification Search
    CPC ..... H04B 7/0452; H04L 1/188; H04L 5/0023; H04L 5/0037; H04L 5/0055; H04W 84/12
    See application file for complete search history.

(56) References Cited

U.S. PATENT DOCUMENTS 10,420,121 B2    9/2019   Hedayat
2006/0056300 A1   3/2006   Tamura et al.
(Continued)

FOREIGN PATENT DOCUMENTS

CN     104255069 A     12/2014
CN     104272848 A      1/2015
(Continued)

OTHER PUBLICATIONS

Evgeny Khorov (IITP RAS): "Random Access RU Allocation in the Trigger Frame," IEEE Draft; 11-16-0582-03-00AX-RANDOM-ACCESS-RU-ALLOCATION-IN-THE-TRIGGER-FRAME, IEEE-SA Mentor, Piscataway, NJ USA, vol. 802.11ax, No. 3 May 18, 2016 (May 18, 2016), pp. 1-24, XP068119389, Retrieved from the Internet: URL: https://mentor.ieee.org/802.11/dcn/16/11-16-0582-03-00ax-random-access-ru-allocation-in-the-trigger-frame.pptx [retrieved on May 18, 2016].
(Continued)

*Primary Examiner* — Brian P Cox
(74) *Attorney, Agent, or Firm* — Seed IP Law Group LLP

(57) ABSTRACT

A transmission apparatus includes a transmitter and a receiver. The transmitter transmits a Trigger Frame for allocating resources for Uplink Multi User (UL MU) transmission, the Trigger Frame comprising a common information field that includes a type subfield indicating one of a plurality of trigger types, wherein the plurality of trigger types includes a first trigger type, a second trigger type and a third trigger type, the first trigger type indicating a basic trigger, the second trigger type indicating multi-user block ack request, and the third trigger type indicating a specific
(Continued)

trigger used for soliciting a specific type of UL MU response frame from a plurality of terminal stations. The receiver, responsive to the type subfield indicating the third trigger type, receives the specific type of UL MU response frame from the plurality of terminal station.

6 Claims, 25 Drawing Sheets

Related U.S. Application Data

No. 17/543,455, filed on Dec. 6, 2021, which is a continuation of application No. 16/304,030, filed as application No. PCT/JP2017/024482 on Jul. 4, 2017, now Pat. No. 11,228,409.

(51) Int. Cl.
*H04L 1/1867* (2023.01)
*H04W 84/12* (2009.01)

(52) U.S. Cl.
CPC .......... *H04L 5/0023* (2013.01); *H04L 5/0055* (2013.01); *H04W 84/12* (2013.01)

(56) References Cited

U.S. PATENT DOCUMENTS

| | | | |
|---|---|---|---|
| 2007/0011504 A1 | 1/2007 | Kim et al. | |
| 2015/0085653 A1 | 3/2015 | Vermani et al. | |
| 2015/0085777 A1 | 3/2015 | Seok | |
| 2015/0092697 A1 | 4/2015 | Yeow et al. | |
| 2015/0131570 A1 | 5/2015 | Kwon et al. | |
| 2015/0156722 A1 | 6/2015 | Kim et al. | |
| 2015/0208436 A1 | 7/2015 | Seok | |
| 2015/0244619 A1 | 8/2015 | Zheng et al. | |
| 2015/0382333 A1 | 12/2015 | Seok | |
| 2016/0049800 A1 | 2/2016 | Tanaka et al. | |
| 2016/0100408 A1 | 4/2016 | Hedayat | |
| 2016/0113034 A1 | 4/2016 | Seok | |
| 2016/0143006 A1 | 5/2016 | Ghosh et al. | |
| 2016/0143026 A1 | 5/2016 | Seok | |
| 2016/0165574 A1 | 6/2016 | Chu et al. | |
| 2016/0165589 A1 | 6/2016 | Chu et al. | |
| 2016/0173377 A1 | 6/2016 | Rong et al. | |
| 2016/0183162 A1 | 6/2016 | Jeong et al. | |
| 2016/0227533 A1* | 8/2016 | Josiam | H04W 74/006 |
| 2016/0374112 A1* | 12/2016 | Asterjadhi | H04W 74/08 |
| 2017/0111096 A1 | 4/2017 | Nabetani | |
| 2017/0272138 A1 | 9/2017 | Chun et al. | |
| 2017/0280358 A1 | 9/2017 | Ma et al. | |
| 2017/0280383 A1 | 9/2017 | Park et al. | |
| 2017/0367118 A1 | 12/2017 | Choi et al. | |
| 2018/0132175 A1* | 5/2018 | Choi | H04W 72/0446 |
| 2018/0191541 A1 | 7/2018 | Fang et al. | |
| 2018/0302930 A1* | 10/2018 | Wang | H04W 74/0833 |
| 2019/0306920 A1* | 10/2019 | Son | H04W 74/0808 |

FOREIGN PATENT DOCUMENTS

| | | |
|---|---|---|
| CN | 104283633 A | 1/2015 |
| CN | 104350799 A | 2/2015 |
| CN | 104429148 A | 3/2015 |
| CN | 104541565 A | 4/2015 |
| CN | 105612806 A | 5/2016 |
| CN | 105744603 A | 7/2016 |
| EP | 1729436 A2 | 12/2006 |
| JP | 2016-508345 A | 3/2016 |
| RU | 2579959 C2 | 4/2016 |
| WO | 2013/169212 A1 | 11/2013 |
| WO | 2016/028131 A1 | 2/2016 |
| WO | 2016/036138 A1 | 3/2016 |
| WO | 2016/052197 A1 | 4/2016 |
| WO | 2016/108633 A1 | 7/2016 |

OTHER PUBLICATIONS

IEEE 802.11-15/0132r17, "Specification Framework for TGax", May 25, 2016.
IEEE 802.11-16/0024r1, "Proposed TGax draft specification", Mar. 2, 2016.
IEEE Std 802.11(TM)—2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012.
International Search Report of PCT application No. PCT/JP2017/024482 dated Aug. 8, 2017.
The Extended European Search Report dated Jul. 8, 2019 for the related European Patent Application No. 17830833.4.
Yang et al. (Huawei), Response Given Trigger Frame Type, IEEE 802.11-16/0051 r1, retrieved from: https://mentor.ieee.org/802.11/dcn/16/11-16-0051-01-00ax-response-give-trigger-type.pptx (Jan. 17, 2016) (Year: 2016).
Yeow et al., "Block ACK Transmission," Doc.: IEEE 802.11-12/0662r0, May 14, 2012, Institute for Infocomm Research, Singapore, 14 pages.
Asterjadhi et al., "HE Variant HT Control—Buffer Status Report," IEEE 802.11-16/0806r0, Jul. 6, 2016. (11 pages).
Hedayat et al., "MU BAR Frame Format," IEEE 802.11-15/1312r1, Nov. 8, 2015. (14 pages).
Huang, "11ax D0.1 Comment Resolution for Trigger Frame Format—MU—RTS Variant," IEEE 802.11-16/0808r0, Jun. 6, 2018. (5 pages).
Khorov et al., "Random Access RU Allocation in the Trigger Frame," IEEE 802.11-16/0582r1, May 16, 2016. (23 pages).
Ryu et al., "Trigger type specific information," IEEE 802.11-15/1345r1, Nov. 8, 2015. (16 pages).
Stacey et al., "Proposed TGax draft Specification," IEEE 802.11-16/0024r0, Jan. 15, 2016. (147 pages).
Yu et al., "Response Given Trigger Frame Type," 802.11-16/0051r0, Jan. 17, 2016. (15 pages).
Banerjea (Qualcomm), "CIDs for: Section 9.3.1.23 Trigger Frame Format," IEEE 802.11-16/0780r1, Apr. 17, 2016. (13 pages).
Ghosh et al. (Intel), Signaling of Multi-TID Aggregation Limit, IEEE 802.11-16/0667r0, May 16, 2016. (16 pages).
Hedayat et al. (Newracom), "MU BAR Frame Format," IEEE 802.11-15/1312r2, Nov. 8, 2015. (14 pages).
Indian OA dated Jun. 6, 2023 for related Indian Patent Application No. 202248025934. (5 pages).
English Translation of Chinese Office Action dated Jul. 21, 2023 for the corresponding Chinese Patent Application No. 202210605346.9. (13 pages).

* cited by examiner

| TF Timeout Value | Meaning |
|---|---|
| 0 | Timeout not set |
| 1 - 255 | Timeout value in TUs (1 TU = 1024μs) |

| Action Category (3 Bits) | Description |
|---|---|
| 0 - 21 | Action Category values as defined in IEEE 802.11 Specification |
| 22 - 31 | Reserved |

| Action Field (3 Bits) | Description |
|---|---|
| 0 | ADDBA Request |
| 1 | ADDBA Response |
| 2 | DELBA |
| 3 - 7 | Reserved |

| Control ID value | Meaning | Length in bits, of the Control Information Subfield | Contents of the Control Information Subfield |
|---|---|---|---|
| 0 | UL MU response scheduling | 26 | UL MU response scheduling |
| 1 | Operation mode indication | 16 | Operation mode indication |
| 2 | HE link adaptation | TBD | HE link adaptation |
| 3 | Buffer Status Report (BSR) | 26 | Buffer status report |
| 4 | TF Timeout | 8 | TF Timeout value |
| 5 - 15 | Reserved | | |

| Trigger Type | Description |
|---|---|
| 0 | Basic Trigger |
| 1 | Beamforming Report Poll Trigger |
| 2 | MU-BAR |
| 3 | MU-RTS |
| 4 | Buffer Status Report Poll (BSRP) variant Trigger |
| 5 | Management frame Trigger |
| 6 - 15 | Reserved |

1102

1130

| Frame Subtype (4 Bits) | Description | Subtype Specific (8 Bits) | Description |
|---|---|---|---|
| 0 - 15 | Management frame subtype | - | Subtype specific details |

| Action Field (3 Bits) | Description |
|---|---|
| 0 | ADDTS Request |
| 1 | ADDTS Response |
| 2 | DELTS |
| 3 | Schedule |
| 4 | QoS Map Configure |
| 5 | ADDTS Reserve Request |
| 6 | ADDTS Reserve Reponse |
| 7 | Reserved |

Fig. 11D

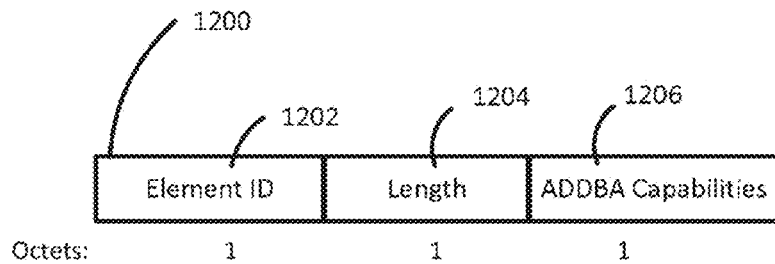
Fig. 12A
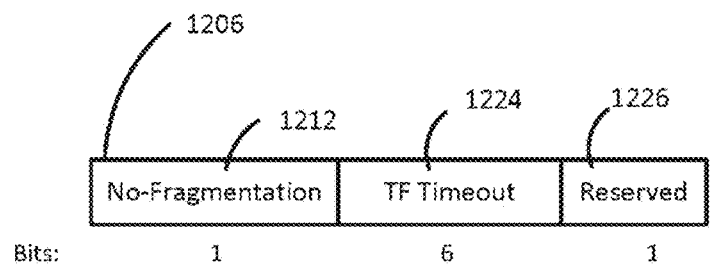
Fig. 12B
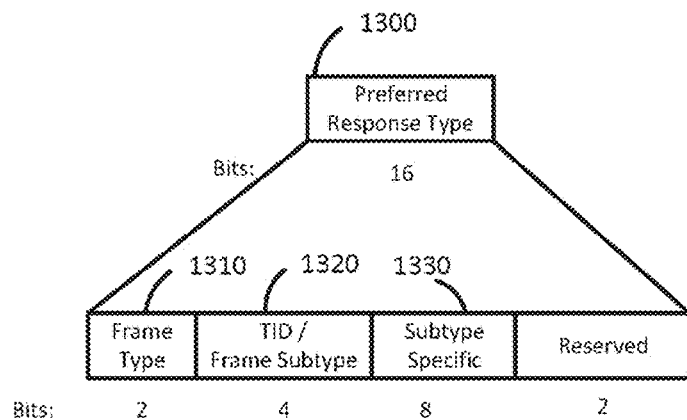
Fig. 12C
Fig. 13A

TRANSMISSION APPARATUS AND TRANSMISSION METHOD

TECHNICAL FIELD

The present disclosure is generally related to a transmission apparatus and a transmission method for exchanging multi-user management frames.

BACKGROUND ART

IEEE (Institute of Electrical and Electronics Engineers) 802.11 Working group is currently in the process of standardizing the next generation WLAN (Wireless Local Area Network) technology under the 802.11ax Taskgroup. The primary goal of the Taskgroup is the improvement of spectrum efficiency to enhance the system throughput/area in high density scenarios of Access Points (AP) and/or terminal Stations ("non-AP STA" or simply STA in the rest of the document). A device based on the IEEE 802.11ax specification is generally termed a High Efficiency (HE) device. Among the various technologies being proposed, Orthogonal Frequency-Division Multiple Access (OFDMA) and uplink multi-user transmission are two key technologies that the IEEE 802.11ax Taskgroup has adopted to achieve the throughput improvement goals. FIG. 1 illustrates an example 802.11ax WLAN network 100 with an AP 190 and several STAs associated with the AP 190.

The IEEE 802.11 specification defines various types of frames that may be exchanged within a wireless network based on IEEE 802.11. Management frames are used to enable and to maintain wireless communication within the wireless network. These frames are generated within the Medium Access Control (MAC) layer of an IEEE 802.11 device and are usually transmitted at a more robust Modulation and Coding Scheme (MCS) in order to ensure their correct reception. Some of the management frames are broadcasted by the Access Point (AP) within the wireless Basic Service Set (BSS). Broadcast management frames includes, for example, a Beacon frame to advertise the presence of a BSS as well as its various properties such as the wireless channel it is operating on, its Service Set Identifier (SSID) etc. A STA that is within a communication range of the AP may use the information obtained from the Beacon frame to initially join the BSS if it has not yet joined the BSS, or to update its records of the BSS if it has already joined the BSS. A majority of the management frames, however, are used in a unicast fashion (i.e., addressed to a particular STA or to the AP).

In some cases the AP may transmit management frames to a particular STA to request it to perform a specific action, (e.g., the Disassociate frame to ask the STA to leave the BSS). In a majority of cases though, there will be an exchange of related management frames between the AP and a STA. As an example, an Association Request frame is transmitted by an AP to a STA and the STA transmits an Association Response frame back to the AP to join a BSS. As another example, an Add Block Acknowledgment (ADDBA) Request is transmitted by an AP to a STA and the STA transmits an ADDBA Response frame back to the AP to setup the use of Block Acknowledgment (Ack) mechanism between two devices.

CITATION LIST

Non Patent Literature

[NPL 1] IEEE802.11-15/0132r17, Specification Framework for TGax, May 2015

[NPL 2] IEEE802.11-16/0024r1, Proposed TGax draft specification

[NPL 3] IEEE Std 802.11-2012

SUMMARY OF INVENTION

Although multi-user transmission is possible in the Downlink using Multi-user Multiple Input Multiple Output (MU-MIMO) and Orthogonal Frequency-Division Multiple Access (OFDMA) can be used in both Downlink (DL) and Uplink (UL), it is difficult to perform management frame exchange in multi-user transmission in an efficient manner.

Thus, a non-limiting exemplary embodiment of the present disclosure provides a transmission apparatus comprising: a transmitter which, in operation, transmits a Trigger Frame for allocating resources for Uplink Multi User (UL MU) transmission, the Trigger Frame comprising a common information field that includes a type subfield indicating one of a plurality of trigger types, wherein the plurality of trigger types includes a first trigger type indicating a basic trigger used for soliciting any type of response frame from a recipient terminal station a second trigger type indicating a specific trigger used for soliciting a specific type of UL MU response frame from a plurality of terminal stations; and a receiver which, in operation, receives the specific type of UL MU response frame from the plurality of terminal stations when the type subfield indicates the second trigger type.

These general and specific aspects may be implemented using a device, a system, a method, and a computer program, and any combination of devices, systems, methods, and computer programs.

The methods described in the present disclosure enable multi-user management frame exchange in an efficient manner.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 10C illustrates a table showing description on Control ID subfield values according to the second embodiment.

FIG. 11D illustrates a table showing description on various Action Field values according to the second embodiment.

FIG. 12A illustrates a format of the ADDBA Extension element field according to the third embodiment.

FIG. 12B illustrates a format of the ADDBA Capabilities field according to the third embodiment.

FIG. 12C illustrates a table showing description on various TF Timeout Values according to the third embodiment.

FIG. 13A illustrates a structure of the Preferred Response Type subfield according to the third embodiment.

DESCRIPTION OF EMBODIMENTS

The present disclosure can be better understood with the aid of following figures and embodiments. The embodiments described here are merely exemplary in nature and are used to describe some of the possible applications and uses of the present disclosure and should not be taken as limiting the present disclosure with regard to alternative embodiments that are not explicitly described herein.

Figure 2:
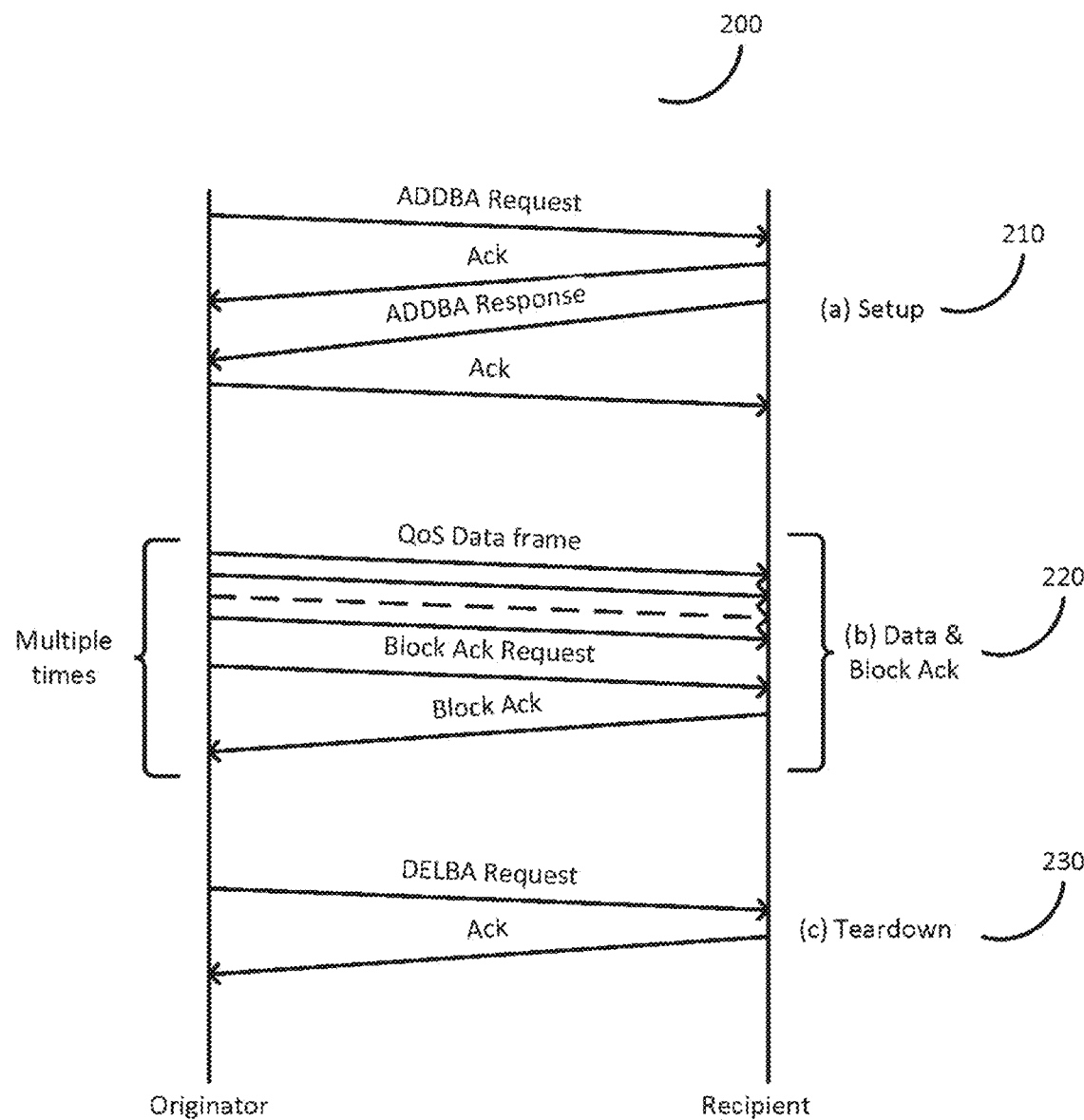
FIG. 2 is a diagram of an example frame exchange sequence involving Setup and Teardown of Block Ack mechanism.

FIG. 2 shows an example sequence 200 of frame exchange between two 802.11 devices which involves the exchange of management frames for the purpose of negotiating Block Ack parameters. In an infrastructure BSS, one of the 802.11 devices will be an AP and the other one will be an STA. The sequence 200 consists of three distinct phases: (a) a Block Ack Setup phase 210, (b) one or more data exchange phases 220 and (c) a Block Ack Teardown phase 230. Block Ack is a feature that was introduced in the IEEE 802.11e amendment and allows an 802.11 device to transmit a burst of frames to another 802.11 device without requiring the receiver to send back immediate Ack frames to each received frame.

The 802.11 device that initiates the burst transmission is known as the Originator while the recipient 802.11 device is known as the Recipient. After completing the burst, the Originator can request the Recipient to transmit a Block Ack that contains a bitmap of the received frames by transmitting a Block Ack Request frame. This exchange is shown in phase 220 in FIG. 2. The IEEE 802.11n amendment further enhanced this feature by allowing the burst of data to be aggregated in a single Management Protocol Data Unit (MPDU) called the A-MPDU. Although Block Ack is a useful feature, before this feature can be used, both the Originator and the Recipient need to prepare additional resources. The Recipient not only needs to allocate additional buffers to receive the burst of frames, but it also needs to maintain a scoreboard to record the reception status of the frames. Similarly the Originator also needs to maintain a record of the transmitted frames. This preparation is done in the Block Ack Setup phase 210. In this phase, the two 802.11 device can negotiate the buffer size, the Traffic Identifier (TID) of the frames involved, the duration for which the negotiation will be in effect etc. Once the data exchange phase is complete, either party may tear down the Block Ack agreement in the Teardown phase 230.

Figure 3:
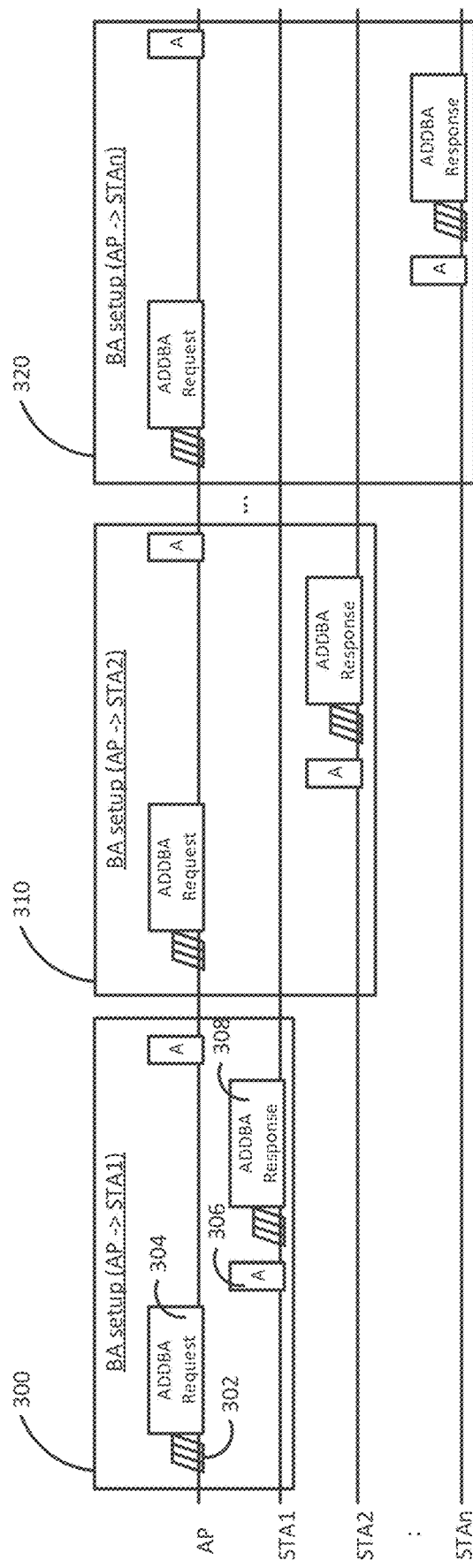
FIG. 3 is a diagram of an example frame exchange sequences for Block Ack setup between an AP and multiple STAs.

As explained earlier, most management frame exchanges occur between two 802.11 devices, usually between an AP and an STA. As an example, the management frame exchange involved in the Block Ack Setup phase 210 is depicted in more detail in FIG. 3. In this example, the AP is the Originator and the STAs are the Recipients. Before the AP has become able to use the Block Ack feature, it needs to setup the Block Ack feature with each STA with which it intends to use the Block Ack feature, one STA at a time. Frame exchange sequences 300, 310 and 320 are initiated by the AP to setup the Block Ack feature with STA1, STA2 and STAn respectively. Each of these involves the exchange of the ADDBA Block Ack Action Management frames between the AP and the respective STA. For example, in the sequence 300, the AP initiates the exchange by contending for the wireless medium; this contention attempt is represented by the symbol 302 in figures throughout this disclosure.

Once the AP wins the contention right, it transmits an ADDBA Request frame 304 uniquely addressed to STA1. Upon receiving the ADDBA Request frame 304, STA1 transmits back an Ack frame 306 to the AP a duration of Short Interframe Space (SIFS) after the end of the ADDBA Request frame. The transmission of Ack frames do not require contending for the wireless medium. Once the STA has processed the ADDBA Request frame and if it accepts the request, the STA sends back the ADDBA Response frame 308 after contending for and winning the wireless medium. The AP acknowledges the receipt of the ADDBA frame by transmitting an Ack frame. Similar frame exchange is required in the reverse direction as well, i.e. initiated by the STAs, if the STAs intend to use the Block Ack feature. It is obvious that if there are many STAs involved, this Setup process will take up a lot of time.

Although multi-user transmission is possible in the Downlink (DL) using Multi-user Multiple Input Multiple Output (MU-MIMO) and in both DL and Uplink (UL) using Orthogonal Frequency-Division Multiple Access (OFDMA), when it comes to management frame exchange, there are still few issues that prevent an efficient multi-user communication, especially in the UL direction. The issues can be summarized as the following two problems: 1) most management frames are transmitted using the highest Enhanced Distributed Channel Access (EDCA) Access Category (AC) AC VO. If the AP transmits multiple management frames to multiple STAs within a DL multi-user PHY Protocol Data Unit (PPDU), the STAs that successfully received the frames will attempt to send back the respective response management frames to the AP as soon as the STAs are ready to do so. At the same time, in order to solicit the multiple response management frames from the STAs in a multi-user fashion, the AP will attempt to transmit the Basic variant of a newly defined control frame called the Trigger frame.

The Basic Trigger frame contains information such as Resource Unit (RU) Allocation, the PPDU length, the MCS etc. to be used for the UL transmission. Upon receiving the Trigger frame, the STAs that are allocated RUs in the Trigger frame can send back the respective UL frames in an UL multi-user PPDU. This leads to the STAs' response management frames contending for the wireless medium among them as well as with the AP's Trigger frame. In case the Trigger frame is unable to gain access to the medium or its transmission is delayed, the STAs will be unable to make use of the multi-user transmission for their UL frames. 2) The Basic variant of the Trigger frame does not specify the frame type that the STAs may send back in the UL multi-user PPDU. This may cause some STAs to send back frames other than the response management frame, leading to a situation where the AP needs to send one or more Trigger frames to those STAs. Both of these factors not only cause inefficiencies but due to the delays in getting back the response frames, some of the request frames may also need to be re-issued due to timeout issues.

Even though the techniques described in the present disclosure may apply to many wireless communication systems, for the sake of example, the rest of the descriptions in this disclosure are described in terms of an IEEE 802.11 WLAN system and its associated terminologies. This should not be taken as limiting the present disclosure with regard to alternative wireless communication systems.

Referring to FIG. 1 again, an example wireless network 100 may include an AP 190 and many associated STAs. STA2 120 and STA6 160 represent a device class with high processing power and possibly high QoS requirements and relatively low requirement for power saving. STA1 110 and STA4 140 represent another device class that may also have high processing power and possibly high QoS requirements but are relatively more concerned about power consumptions. On the other extreme, STA3 130 and STA5 150 represent another class of devices that may have low processing power and may be very sensitive to power consumption. In IEEE 802.11ax terms, STA1 110, STA2 120, STA4 140 and STA6 160 may be considered as Class A devices which are high capability devices while STA3 130 and STA5 150 are consider Class B devices which are low capability devices.

A fundamental challenge in any wireless communication is the fact that a wireless transceiver can either be in the transmit state or in the receive state at any one instance of time. Even if a wireless device contains multiple transceivers, since the transmit signal is several magnitude stronger than the received signal, while the transceiver is transmitting on a particular frequency, it is unable to receive any signal on the same frequency. Due to this, virtually all wireless devices operate in half-duplex communication. This fact also leads to the next challenge: a transmitter, on its own, is unable to detect any collision that may occur to its transmit signal.

In IEEE 802.11, this is overcome by the use of positive acknowledgments from the recipient devices. If requested by the transmitter, the recipient will send back some sort of acknowledgement frame (Ack/Block Ack etc.) to acknowledge the successful receipt of the transmitter's frame. If a transmitter fails to receive any acknowledgment for its transmission, it will assume that the transmission has failed and it may proceed to perform recovery actions such as re-transmitting the frame etc. As preventive measure, IEEE 802.11 uses Channel Sense Multiple Access with Collision Avoidance (CSMA/CA) as the primary channel access mechanism. Collision Avoidance is achieved through the use of random backoffs, whereas CSMA involves the use of physical and virtual Channel Sense (CS) mechanisms. Physical CS mechanism is provided by the PHY layer and involves actual sensing of the wireless medium (either Preamble Detection or Energy Detection or both). Virtual CS mechanism is provided by the MAC layer and makes use of the Network Allocation Vector (NAV). The NAV maintains a prediction of future traffic on the medium based on the duration information that is announced in most IEEE 802.11 frames. This duration may be contained in the MAC header and/or may also be obtained from the Transmit Opportunity (TXOP) duration in the PHY header if present. When either the physical CS or the virtual CS indicates that the medium is busy, a device is not allowed to transmit any signal except for some specific frames such as the Ack frame or Block Ack frame. Although NAV is useful to protect the transmission of a device from third party devices that are in its communication range, NAV is not designed to prevent contention from STAs that are recipients of the frames that set the NAV.

Multi-user transmission was introduced in IEEE 802.11ac amendment through the MU-MIMO technology but only in downlink. The AP could transmit different unicast frames that are addressed to different STAs using different spatial streams. However due to the requirement for additional antennas and other complexities, the feature was not introduced in the uplink direction. As explained earlier, multi-user transmission using OFDMA in both downlink and uplink direction is a key technology that the IEEE 802.11ax Taskgroup has adopted to achieve the throughput improvement goals. In the downlink direction, since it is the AP that will be transmitting all the multi-user frames, the multi-user transmission is comparatively simpler. The DL multi-user PPDU is made up of a wide channel PHY header that carries the information regarding the narrow band channels (known as Resource Units or RUs) on which each individual PHY Service Data Unit (PSDU) is carried. Theoretically, within one 20 MHz channel, up to 37 independent transmissions can be carried to 37 distinct STAs in a multi-user PPDU.

Transmission in the uplink direction is more complicated since there is a need for time synchronization between the transmissions from multiple STAs and also it has to be ensured that the transmissions from different STAs do not interfere with each other i.e. each STA has to be assigned a unique RU. This is achieved in IEEE 802.11ax through a special control frame called a Trigger frame which is transmitted by the AP. The Trigger frame contains information such as Resource Unit (RU) Allocation, the PPDU length, the MCS etc. to be used for the UL transmission. Upon receiving the Trigger frame, the STAs that are allocated RUs in the Trigger frame can transmit the respective UL frames in an UL multi-user PPDU after SIFS from the end of the Trigger frame without the need to contend for the wireless medium. Aside from the Basic Trigger frame that may be used to solicit any type of frames, various variants of the Trigger frames have been defined to solicit specific type of frames. For example the MU-RTS variant is used to solicit CTS frames from multiple STAs while the MU-BAR is used to solicit Block Ack frames from multiple STAs etc.

Based on the above knowledge, the inventors of this application have reached the present disclosure. Methods are disclosed that enable the efficient and timely exchange of multi-user management frame exchange. According to one aspect of the present disclosure, the AP, in a DL PPDU carrying one or more frames, indicates a duration of time during which a recipient STA that is addressed in a frame contained in the DL PPDU, is not allowed to transmit any frame other than the immediate acknowledgment to the preceding DL PPDU until the STA receives another frame that explicitly gives the STA permission to transmit again. This may be looked upon as the transmitter protecting its future transmission from the one or more STAs that are recipients of its earlier transmission. Protection from third party STAs can be ensured by using the traditional NAV protection mechanism. This will allow the AP to transmit the Trigger frame soliciting the UL multi-user PPDU in a timely manner.

The second aspect of the present disclosure involves customizing the Trigger frame to restrict the frame types being solicited in the UL PPDU to the type that is preferred by the AP. In the case of multi-user management frame exchange, this involves indicating in the Trigger frame, using a particular Trigger frame type or using a new variant of the Basic Trigger frame, the exact management frame type and sub-type and other details that will enable the addressed STAs to unambiguously identify the exact management frame type preferred by the AP to be included in the UL PPDU.

The various exemplary embodiments for the multi-user management frame exchange proposed in the present disclosure are described in detail in the following sections.

First Embodiment

As mentioned earlier, one of the challenges of multi-user management frame exchange, when the exchange is initiated by the AP by sending a DL multi-user PPDU containing management request frames addressed to multiple STAs, is the fact that the corresponding single user management response/report frames from the respective STAs will contend for the medium with the AP's Trigger frame and may cause delays to the transmission of the Trigger frame. Since the UL multi-user PPDU carrying the multiple management response frames is not allowed to be transmitted without receiving the Trigger frame from the AP, this will cause disruption to the multi-user management frame exchange.

It is possible that the AP will attempt to protect the subsequent response frames from the STAs by including a longer TXOP duration in the DL PPDU that initiates the frame exchange thereby setting the NAVs of the third party STAs. Alternatively the AP may also use protection mechanisms such as the exchange of Multi-user RTS (MU-RTS) and CTS frames prior to the management frame exchange. However, this does not solve the problem of the Trigger frame being delayed due to contention from STAs that are the recipient of the DL PPDU since the NAV setting rules does not apply to the STAs. It is possible that the AP could attempt to avoid the above mentioned contention from STAs that are the recipient of the DL PPDU by transmitting a Trigger frame after a Short Interframe Space (SIFS) from the end of the UL PPDU carrying the STA's Ack frames to the DL PPDU, thereby preventing the STAs' single user management response/report frames from contending for the medium. However this method may not always work since STAs may not be able to prepare the management response/report frames within this duration. This could be due to several factors, e.g. the STA's processing capabilities, or the nature of management frame being exchanged, or the STA being busy with other processes at the time of receiving the management request frame and so on. This will lead to RUs of the UL PPDU being unused, which is not only inefficient use of medium, but in extreme cases, may also lead to third party STAs sensing the medium as being idle and transmitting, causing collision at the AP.

In order to solve this issue, a new protection mechanism is introduced in the present disclosure. This involves the AP including a time duration representing the Trigger Frame Timeout, called the TF Timeout hereon, in the downlink unicast frames. The inclusion of the TF Timeout in a frame indicates the AP's intention of transmitting, as the next downlink frame, a Trigger Frame within the timeout duration that allocates RU to the recipient STA to transmit the uplink frame. The TF Timeout may be carried as a separate field in a new element defined for the express purpose of carrying the TF Timeout or it may also be carried in an existing element.

Figures 4A, 4B:
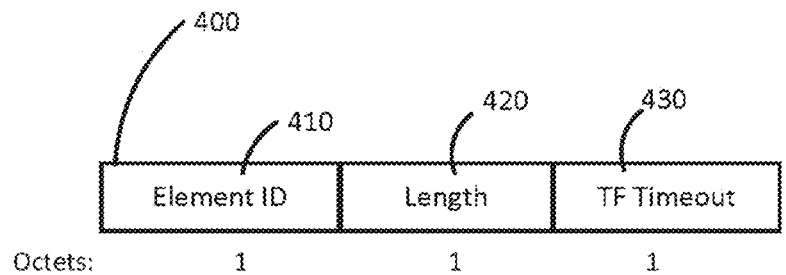
FIG. 4A illustrates an element structure used to carry the "TF Timeout" field as used in the first embodiment.
FIG. 4B illustrates a table showing meaning of the "TF Timeout" field in the first embodiment.

FIG. 4A illustrates a construction of an element 400 that carries the TF Timeout duration according to the first embodiment. The element 400 comprises an Element ID 410, a Length field 420 and the TF Timeout field 430. The Element ID 410 uniquely identifies the element, is one octet long and is defined by the IEEE 802.11 specification. The Length field 420 is also one octet long and specifies the number of octets following the Length field. In this example, the Length field indicates one octet.

The TF Timeout field 430 is also one octet long and its encoding is as shown in Table 450 in FIG. 4B. If the TF Timeout is set to 0, this indicates that the Timeout is not set, or it will reset the TF Timeout if it was previously set to a non-zero value. If set to a non-zero value, the TF Timeout indicates a timeout duration in units of Time Units (TU, 1 TU=1024 μs).

Figure 5:
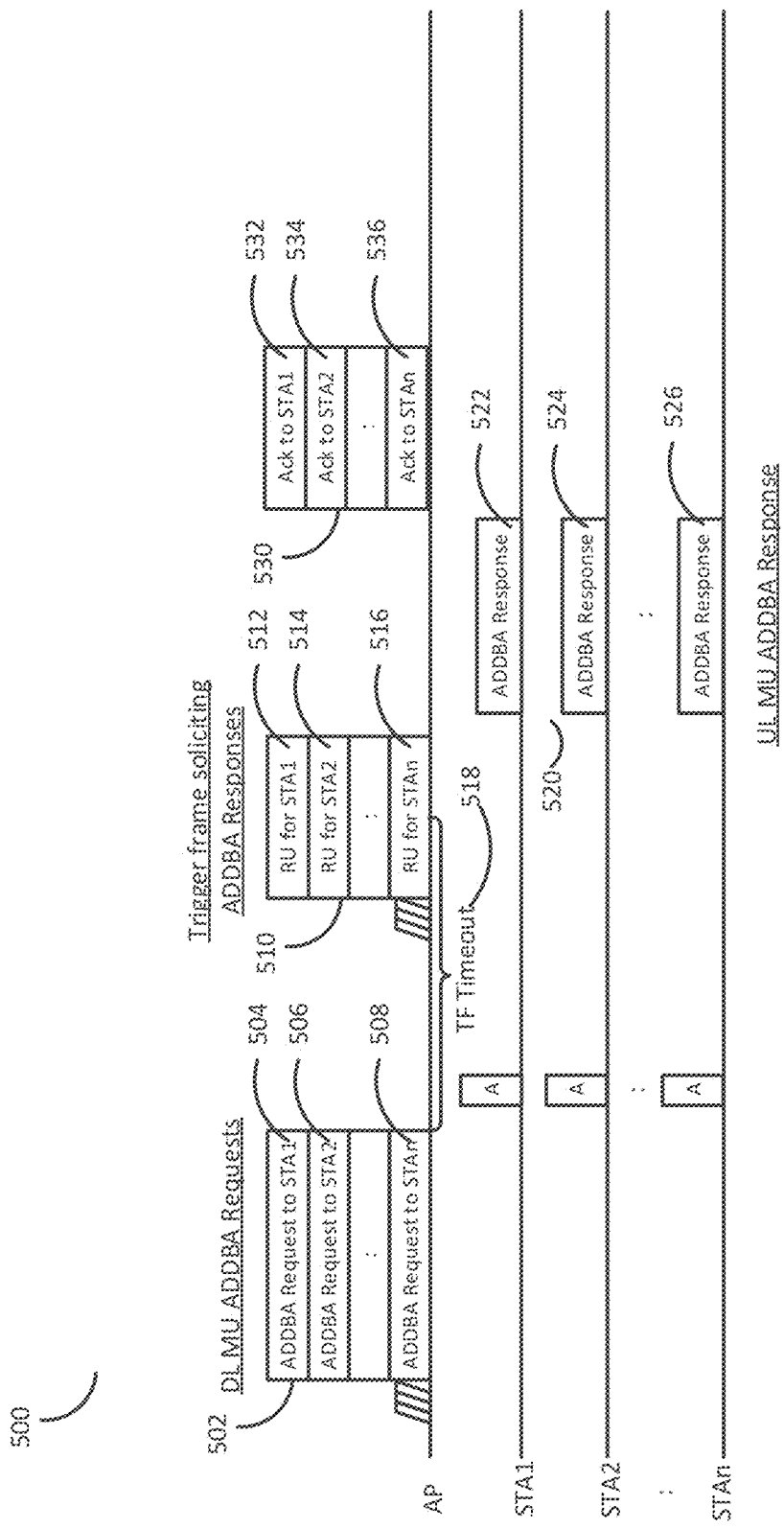
FIG. 5 is a diagram of an example multi-user management frame exchange according to the present disclosure, initiated by the AP.

FIG. 5 illustrates an example multi-user management frame exchange 500 that is made possible by the current disclosure. The frame exchange sequence in this example is the multi-user version of the Block Ack setup process mentioned in FIG. 3 and involves the exchange of ADDBA Request frames from the AP (Originator) and the ADDBA Response frames from the STAs (Recipients). The frame exchange is initiated by the AP by contending for the medium and upon winning contention, transmitting an OFDMA DL multi-user PPDU 502 carrying one or more unicast ADDBA request frames 504, 506, . . . , 508 addressed to STA1, STA2, STAn. The phrase "X, ..., Y" here and in the subsequent texts represent objects numbered from X to Y in ascending order. The letter 'n' in STAn represents a number larger than 2 and smaller than the maximum number of STAs that may be addressed in a multi-user PPDU.

As per the first embodiment, each of the ADDBA Request frames 504, 506, ..., 508 also carry the element 400 that includes the TF Timeout field 430. The TF Timeout field 430 indicates a duration of time, as visualized by 518, during which the STAs STA1, STA2, STAn with addresses matching the Receiver Address field of the respective ADDBA Request frames 504, 506, ..., 508, are not allowed to transmit any frame other than the immediate acknowledgment to the preceding DL PPDU until the STAs receive a Trigger frame 510 that allocates RUs to the STAs to transmit their respective UL frames. To decide the appropriate value to be used for the TF Timeout duration, the AP may consider several factors, such as the type of the management frames being exchanged or the processing capabilities of the STAs etc. For e.g. the AP may set a longer TF Timeout duration for the exchange of ADDTS management frames since the ADDTS frames involve many parameters and the STAs may require longer time to prepare the ADDTS frames. Similarly, the AP may set a shorter TF Timeout duration if all the STAs involved in the exchange are higher capabilities Class A devices, and a longer TF Timeout duration if the STAs are lower capabilities Class B devices.

The AP's selection of the TF Timeout duration may also be based on the AP's knowledge of previous Block Ack Setup attempts with a STA. For example if a previous Block Ack Setup attempt with a STA failed due to the STA not being able to transmit the ADDBA Response frame on time, the AP may select a longer TF Timeout Duration for the STA in subsequent Block Ack Setup attempt. The TF Timeout duration for the group of STAs taking part in the same frame exchange should be set to the same value. The TF Timeout duration calculation may be done by a dedicated module 1854 in the MAC layer of the AP or it may be implemented as a software function within the MAC. A STA that receives the TF Timeout duration may implement a separate timer (TF Timeout Timer 1954) within the MAC layer to count down this duration and may set a TX Restriction Flag 1958 that restricts any transmission while the timer value is non-zero. Upon receiving a valid Trigger frame from the AP, allocating RUs to the STA to transmit its UL frames, the TF Timeout Timer 1954 will be reset to zero and the TX Restriction Flag 1958 will be cleared.

After the AP has received Ack frames for the ADDBA Request frames, it will transmit a Trigger frame 510 to the STAs to solicit the ADDBA Response frames from the STAs that sent back the Ack frames. Aside from the other information mentioned earlier, the Trigger frame 510 will include information to restrict the frame type that the STAs may transmit in the immediately following UL PPDU to ADDBA Response frames. In the example sequence 500, the Trigger frame 510 allocates RUs 512, 514, ..., 516 to STA1, STA2, STAn respectively. The Trigger frame may be transmitted as a broadcast Trigger frame in a Single User PPDU format or it may also be transmitted as multiple unicast Trigger frames in a Multi-user PPDU format.

The AP may contend for medium and attempt to transmit the Trigger frame 510 immediately after receiving the Ack frames from the STAs if the AP is confident that the STAs will be able to prepare the ADDBA Response frames in time. Alternatively it may choose to attempt the transmission slightly later in order to provide more time to the STAs to prepare the ADDBA Response frames but this involves the risk that other third party STAs may pre-empt the transmission of the Trigger frame. This risk may be minimized by using protection mechanisms such as the exchange of Multi-user RTS (MU-RTS) and CTS frames prior to the management frame exchange. How the AP chooses the TXOP duration to be used in the MU-RTS/CTS exchange or the initial downlink MU PPDU to protect the multi-user management frame exchange may also depend on the TF Timeout duration. Ideally, a TXOP duration that covers the entire management frame exchange would be preferable in order to protect the management frame exchange from third party STAs, but this may not be desirable when the TF timeout duration is comparatively long since such protection may be considered unfair for the third party stations.

A more reasonable approach may be for the AP to set a TXOP duration just long enough to protect the Trigger frame 510 soliciting the response management frames and the Trigger frame 510 initiates the next TXOP with a TXOP duration long enough to protect the subsequent frame exchange. An even more conservative approach may be to set the TXOP duration only till the Ack frames acknowledging the downlink MU PPDU 502 in which case there will be no protection against third party STAs. How the AP or the STAs involved in the management frame exchange contend for the medium to transmit the Trigger frame or the single user response management frames may also depend on the length of the TXOP duration. Within the TXOP duration, the contention may only involving sensing the medium for a fixed duration e.g. PIFS without performing random backoff whereas outside of the TXOP duration, the medium contention also involves random backoff.

Upon receiving the Trigger Frame 510, each of the STAs STA1, STA2, STAn will transmit the UL multi-user PPDU 520, the PHY header occupying the entire full band and the respective ADDBA Response frames 522, 524, ..., 526 occupying the narrow bands on the respective allocated RUs 512, 514, ..., 516. Upon receiving the UL multi-user PPDU 520, the AP completes the frame exchange by transmitting the acknowledgment frame 530 as a DL multi-user PPDU carrying the individual Ack frames 532, 543, ..., 536 on separate RUs.

Figure 6:
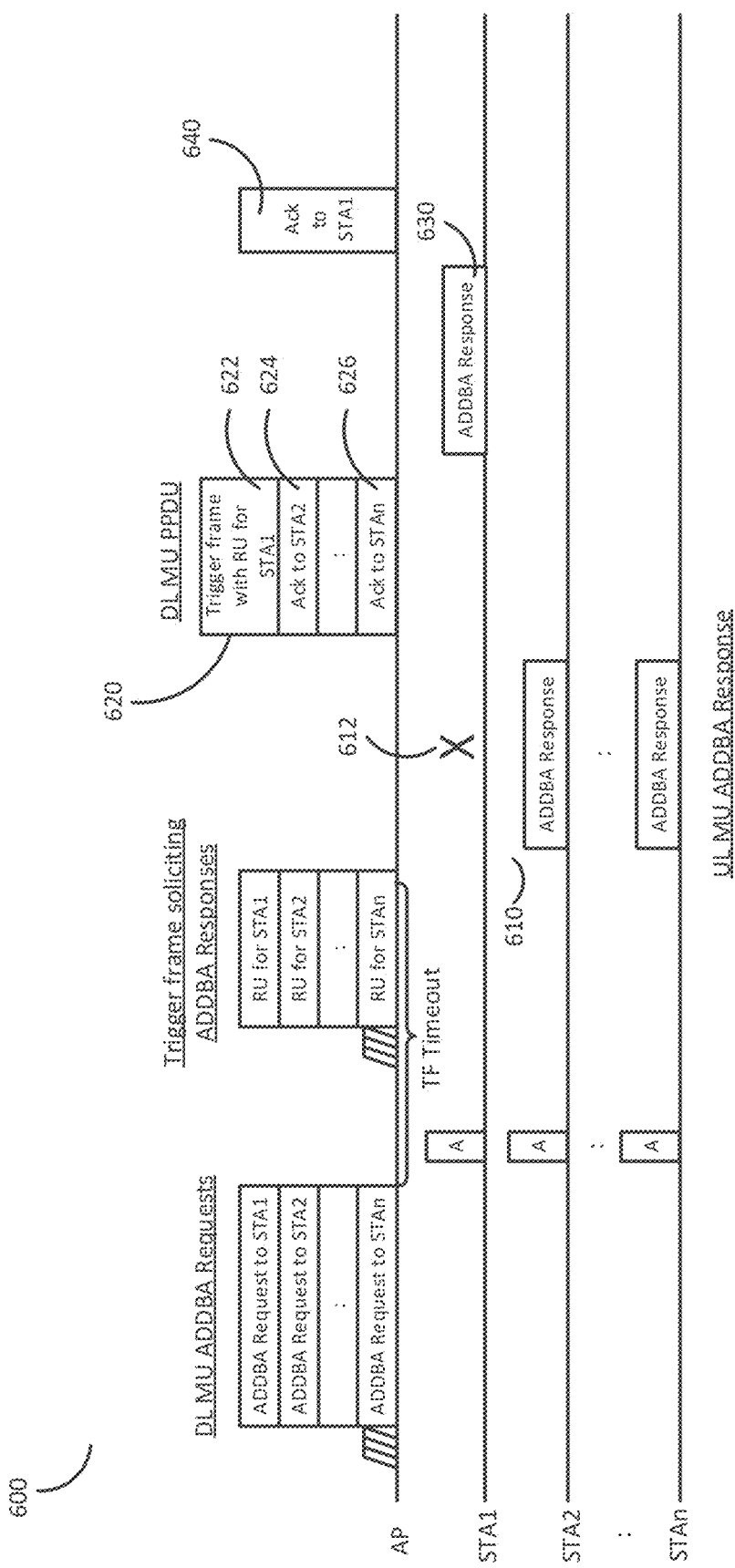
FIG. 6 is a diagram of another example multi-user management frame exchange according to the present disclosure, initiated by the AP.

FIG. 6 illustrates the frame exchange sequence 600 which is very similar to the frame exchange sequence 500 but it gives an example of a case where one or more STAs are unable to prepare the solicited management frame in time, namely the ADDBA Response frame in this example. Here, STA1 is unable to send back the ADDBA Response frame and the RU allocated to STA1 is empty as depicted by 612. In such a case, the AP will use the knowledge that STA1 had previously acknowledged the ADDBA Request frame to make an educated assumption that STA1 will attempt to transmit the ADDBA Response frame at a later point in time.

In order to avoid the inefficiency of EDCA channel access, the AP can send transmit another Trigger frame 622 to STA1 in the same DL multi-user PPDU carrying the Ack frames 624, ..., 626 to STAs2, STAn, with each Ack frame occupying one RU. Since the Trigger frame 622 is longer that an Ack frame, the AP can allocate a bigger RU for the Trigger frame as compared to the RUs carrying the Ack frames in order to minimize padding. In addition, since the Trigger frame 622 only allocates RU for one STA i.e. STA1, the AP will most likely allocate the largest RU in that frequency band for e.g. the 242 tone RU in an operating band of 20 MHz. This would be considered a special use of the Trigger frame since the solicited uplink PPDU carries the PSDU from a single user instead of the more usual case of multiple PSDUs from multiple users.

For management frame exchanges other than ADDBA frame exchanges, if the AP and STAs have already preformed the Block Ack setup, the AP could also use a single Multi-STA Block Ack variant frame to acknowledge the ADDBA Request frames from STAs2, STAn instead of individual Ack frames 624, . . . , 626. This would also help to balance the RU sizes between the Trigger Frame 622 and the Ack frames. SIFS duration after the end of the Trigger frame 620, STA1 transmits back the ADDBA Response frame 630 to the AP on the RU allocated to it by the Trigger Frame 622. Finally, the AP concludes the frame exchange by transmitting the Ack frame 640. Although in this example only STA1 fails to transmit the ADDBA Response frame the first time round, many other scenarios are possible with other STAs also failing to transmit the respective ADDBA Response frames or a STA failing to transmit the ADDBA Response time even after the second or subsequent Trigger frames. It should be obvious to a skilled person that the recovery action explained here, i.e. transmitting another Trigger frame in the same PPDU as the Ack frames, will also work to recover the frame exchange sequence in such cases. The AP may repeat the process till the number of STAs that failed to transmit the ADDBA Response frame is below a pre-set value, or the recovery attempt has exceeded a pre-set timeout duration decided by the AP for the multi-user frame exchange sequence.

Figure 7:
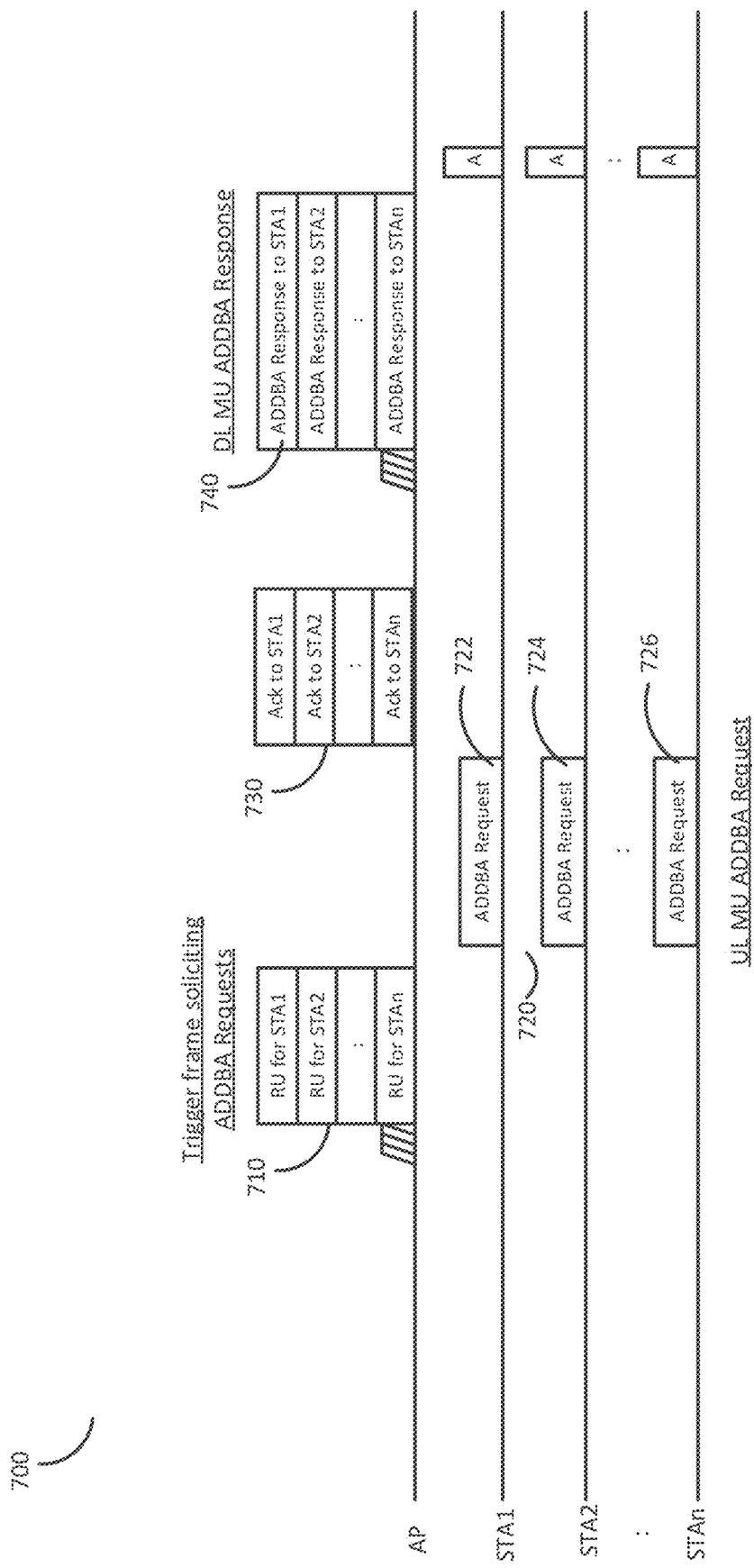
FIG. 7 is a diagram of another example multi-user management frame exchange according to the present disclosure, initiated by the STAs.

FIG. 7 illustrates another example multi-user management frame exchange sequence 700 which is used to setup Block Ack mechanism between STA1, STA2, STAn (Originators) and the AP with which the STAs are associated (Recipient). In a single user case, a STA would initiate the ADDBA frame exchange by transmitting an ADDBA Request to the AP. It is always possible for the AP to wait for many such requests from multiple STAs and consolidate the ADDBA Response frames in a DL multi-user PPDU. However, a more efficient method would be to synchronize the ADDBA Requests from the STAs.

It is assumed that the AP would have sufficient information regarding the STAs that are most likely to request for Block Ack setup. The AP could gather such information beforehand by passively collecting the unsolicited Buffer Status Reports from the STAs or the AP could also actively poll the STAs for their Buffer Status Report using the Buffer Status Report Poll (BSRP) variant Trigger frame. STAs that indicate buffer load above a certain threshold may be considered candidates for the multi-user Block Ack setup. The AP could also use information of existing Traffic Stream (TS) that STAs may have setup with the AP to decide the candidate STAs for the multi-user Block Ack setup. The AP initiates the frame exchange sequence by transmitting a Trigger frame 710 soliciting ADDBA Request frames from the candidate STAs STA1, STA2, STAn.

Upon receiving the Trigger frame 710, each of the addressed STA prepares the respective ADDBA Request frames 722, 724, . . . , 726 and transmits them in the respective allocated RUs in the UL multi-user PPDU 720. The AP acknowledges the receipt of the UL multi-user PPDU 720 by transmitting the DL multi-user PPDU 730 carrying the respective Ack frames. Once the AP has finished preparing all the ADDBA Response frames, it contends for the medium and upon winning contention, transmits the DL multi-user PPDU 740 carrying the ADDBA Response frames to the STAs. Finally, the frame exchange sequence is concluded by the STAs by transmitting the UL multi-user PPDU carrying the respective Ack frames.

Figure 8:
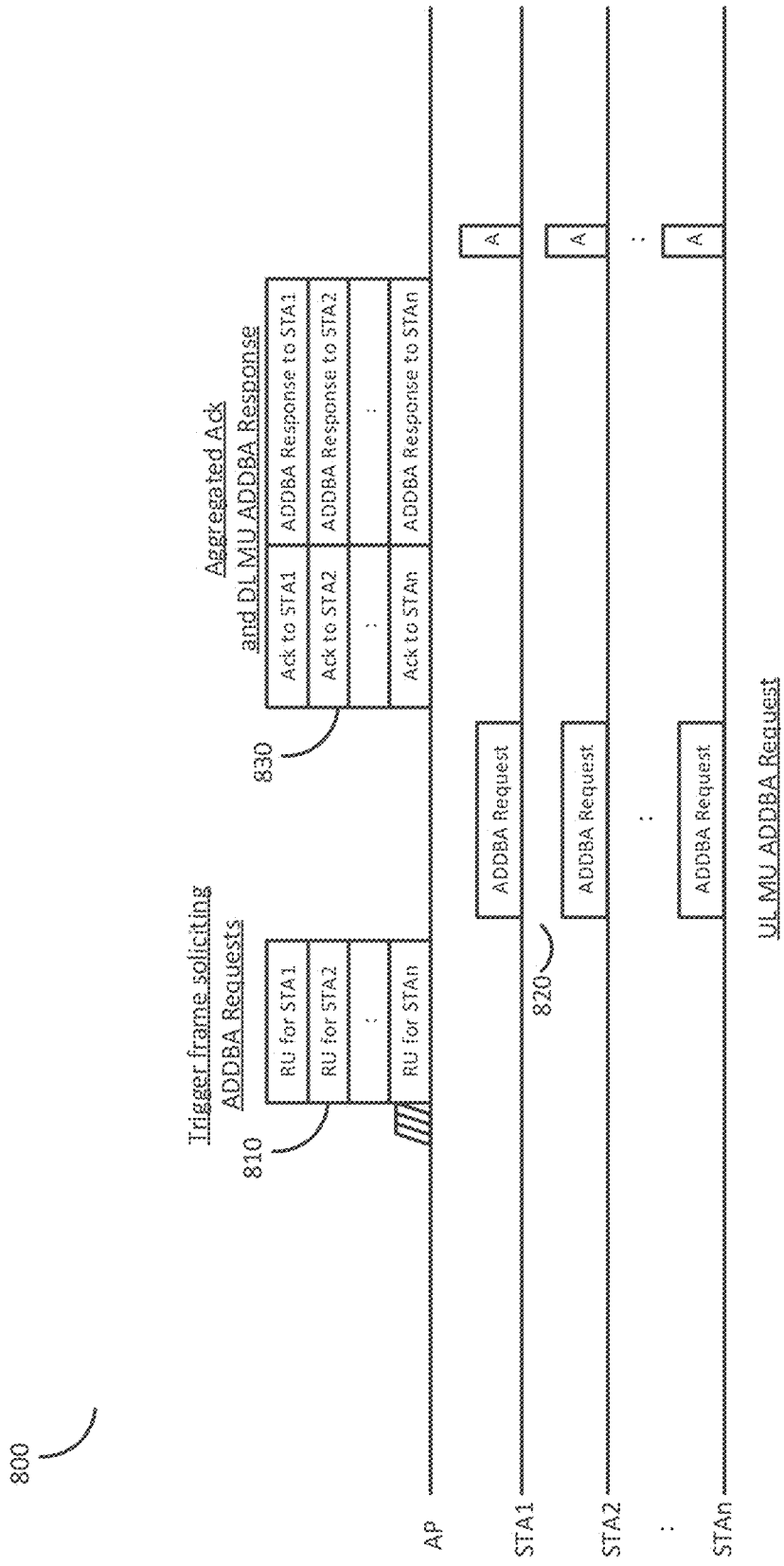
FIG. 8 is a diagram of yet another example multi-user management frame exchange according to the present disclosure, initiated by the STAs.

FIG. 8 illustrates another management frame exchange sequence 800 very similar to the frame exchange sequence 700. The AP initiates the frame exchange sequence by transmitting a Trigger frame 810 soliciting ADDBA Request frames from the candidate STAs STA1, STA2, STAn. Upon receiving the Trigger frame, each of the addressed STA prepares the respective ADDBA Request frames and transmits them in the respective allocated RUs in the UL multi-user PPDU 820. In this example the AP is fast enough to prepare the ADDBA Response frames within SIFS duration of receiving the ADDBA Request frames. In order to avoid the inefficiencies of EDCA contention, for each STA, the AP aggregates the Ack frame to the ADDBA Request frame and the respective ADDBA Response frame and transmits them in a DL multi-user PPDU 830 SIFS after the end of the UL PPDU 820. Finally, the frame exchange sequence is concluded by the STAs by transmitting the UL multi-user PPDU carrying the respective Ack frames. In this example, it is assumed that the AP sets the TXOP duration in the Trigger frame 810 long enough to complete the entire frame exchange sequence 800.

Figure 9A:
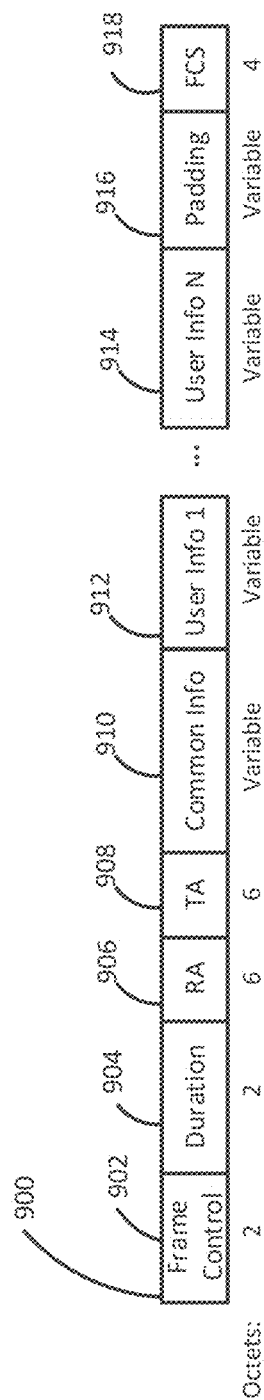
FIG. 9A illustrates a structure of the Trigger Frame according to the first embodiment.

FIG. 9A illustrates the structure of the Trigger frame which may be customized to solicit a specific type of frame as per the current disclosure. The frame structure 900 has been proposed in IEEE 802.11ax as a special control frame called Trigger frame used to solicit and allocate resources for UL multi-user transmissions. Aside from the common MAC frame fields such as Frame Control 902, Duration 904, Receiver Address (RA) 906, Transmitter Address (TA) 908 and the Frame Check Sequence (FCS) 918, the Trigger frame also contains the following fields:

A Common Info field 910 used to indicate the information that is common to all the STAs that are allocated RUs by the Trigger frame, One or more User Info fields 912, . . . , 914 used to indicate information specific to a particular user. A broadcast Trigger frame carries multiple User Info fields, whereas a unicast Trigger frame only carries a single User Info field, Optionally the Trigger frame may also include a Padding field 916 in order to extend the Trigger frame and to provide more time for STAs to prepare the UL multi-user PPDU.

Figure 9B:
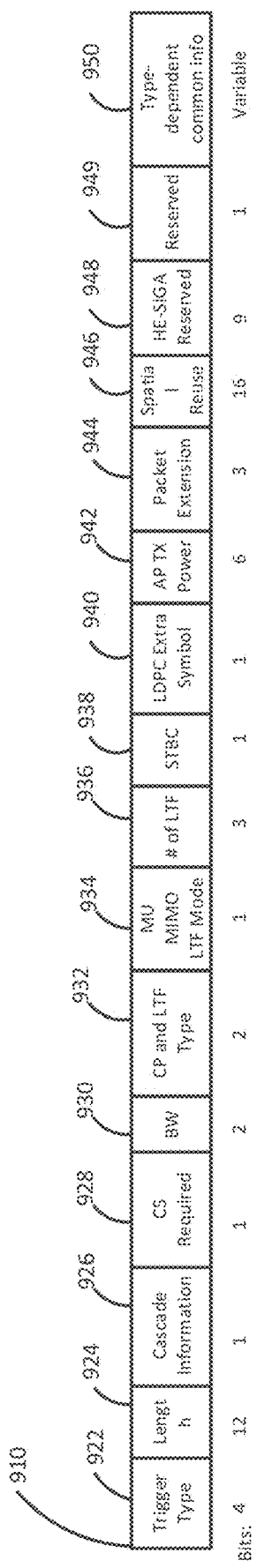
FIG. 9B illustrates a structure of the Common Info field according to the first embodiment.

FIG. 9B illustrates the structure of the Common Info field 910 and contains the following subfields:

A Trigger Type subfield 922 indicates the type of the Trigger frame. In the first embodiment, the Trigger Type subfield is set to the value 0 (zero) and indicates the Basic Trigger frame, A Length subfield 924 indicates that length of the solicited UL PPDU.

A Cascade Information subfield 926, which if 1 indicates that a subsequent Trigger frame will follow the current Trigger frame, A CS Required field 928 indicates whether a STA is required to do a physical and virtual Carrier Sensing before transmitting a response frame, A BW field 930 indicates the channel bandwidth, Subfields CP and LTF Type 932, MU MIMO LTF mode 934, # of LTF 936, STBC 938, LDPC Extra Symbol 940, AP TX Power 942 and Packet Extension 944 indicate information necessary for the PHY layer to prepare and transmit the UL PPDU, A Spatial Reuse subfield 946 indicates information for Spatial Reuse of the medium, A HE-SIGA Reserved subfield 948 indicating how the reserved bits in the SIGA of the UL PPDU should be set, A Type-dependent common info subfield 950 indicates information specific to that particular Trigger frame type. The current Basic Trigger frame proposed in IEEE 802.11ax does not contain the Type-dependent common info subfield.

Figure 9C:
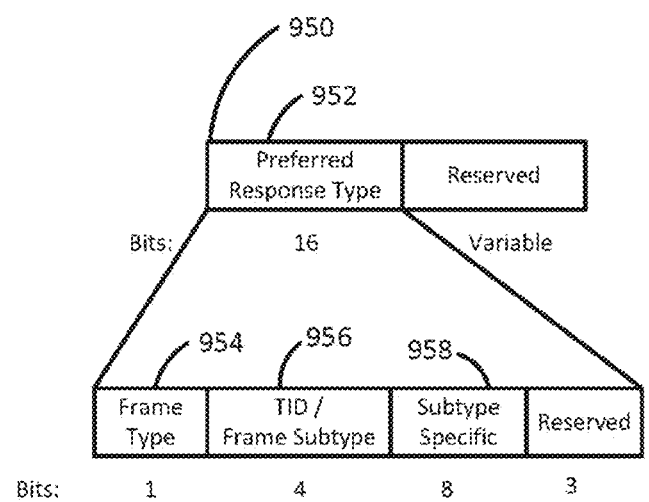
FIG. 9C illustrates a structure of the Type-dependent Common Info field according to the first embodiment.

FIG. 9C illustrates the structure of the Type-dependent Common Info field 950 proposed in the first embodiment to restrict the frame types that the STAs indicated in the User Info fields may include in the UL PPDU that follows the Trigger frame. The Basic Trigger frame currently does not impose any restriction on the response frame types that may be included in the UL PPDU. As per the first embodiment a two-octet long Preferred Response Type subfield 952 is included in the Type-dependent Common Info field 950 and contains the following subfields:

A one-bit long Frame Type subfield 954 indicates the frame type solicited in the UL PPDU. A value of 0 indicates a Data frame while a value of 1 indicates a Management frame.

A four-bit long TID/Frame Subtype subfield 956 indicates the TID of the Data frame if the Frame Type subfield 954 indicates a Data frame, or the Management frame Subtype if the Frame Type subfield 954 indicates a Management frame. The same frame subtype encoding as that of the Subtype subfield defined for the Frame Control field in the IEEE 802.11 specification may be used e.g. 0 for Association Request frame, 13 for Action frame etc.

A one-octet long Subtype Specific subfield 958 which is reserved if the Frame Type subfield 954 indicates a Data frame, and indicates further details regarding the frame type if the Frame Type subfield 954 indicates a Management frame. The encoding of the Subtype Specific subfield 958 may differ for different Management frames. For example if the Frame Subtype subfield 956 indicates 13 i.e. Management Action frame, the Subtype Specific subfield 958 is further divided into a five-bit long Action Category subfield 972 and a three-bit long Action Field subfield 974. The encoding of the Action Category subfield 972 is as detailed in table 980 in FIG. 9F and values 0 to 21 is used to specify the Action frame Category as defined in the IEEE 802.11 specification; e.g. 0 for Spectrum Management Action frames, 3 for Block Ack Action frames etc. The Action Field subfield 974 specifies the frame format within the Action frame category and an example when the Action Category indicates Block Ack Action frames is as detailed in table 990 in FIG. 9G. The meaning of the values 0 to 7 are the same as defined in the relevant section of the IEEE 802.11 specification; e.g. 0 indicates ADDBA Request, 1 indicates ADDBA Response etc.

Figure 9D:
FIG. 9D illustrates a table showing descriptions of several frame types according to the first embodiment.

The encoding of the Preferred Response Type is summarized in the table 960 in FIG. 9D.

Second Embodiment

As per the second embodiment the AP indicates the TF Timeout using one of the control subfields within the Aggregated Control (A-Control) subfield of the HE Variant HT Control field.

Figure 10A:
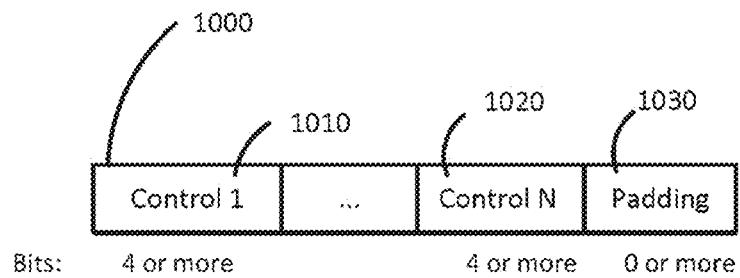
FIG. 10A illustrates a structure of the HE Variant Aggregated Control (A-Control) subfield used to carry the "TF Timeout" field as used in the second embodiment.
Figure 10B:
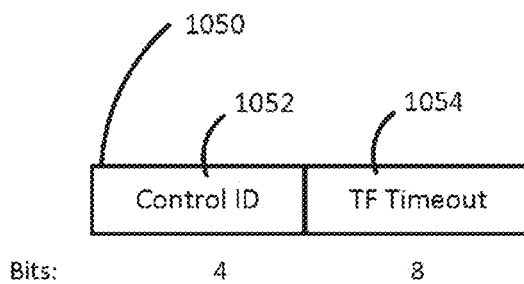
FIG. 10B illustrates a format of the Control subfield according to the second embodiment.

FIG. 10A illustrates the format of the A-Control subfield of the HE Variant HT Control field 1000 as defined in IEEE 802.11ax. The A-Control subfield contains a sequence of one or more Control subfields 1010, ..., 1020, followed by an optional Padding subfield 1030 which is set to a sequence of zeros so as to make the length of the A-Control subfield equal to 30 bits. Each Control subfield is made up of a four-bit long Control ID subfield and a variable length Control Information subfield. The Control ID subfield indicates the type of information carried in the Control Information subfield, while the length of the Control Information subfield is fixed for each value of the Control ID subfield that is not reserved. Control IDs 0 to 3 have been defined in 802.11ax and their details are as shown in Table 1060 in FIG. 10C. FIG. 10B illustrates the format of the Control subfield 1050 used to carry the TF Timeout as per the second embodiment. Aside from the Control ID subfield 1052, it carries the eight-bit long TF Timeout subfield 1054. A potential encoding of the subfields are as detailed in row 1062 in Table 1060. Carrying the TF Timeout within the A-Control subfield in the MAC header of a downlink frame could be an efficient way of signaling the TF Timeout.

As per the second embodiment, a new Trigger Type is defined for the Trigger Frame that is used to solicit Management frames. Table 1100 in FIG. 11A details the various Trigger Types that have been defined in 802.11ax, with row 1102 showing an example encoding for the Trigger Type used to solicit Management frames as proposed in the second embodiment. When used to solicit Management frames, the Trigger Type subfield 922 would be set to a value that indicates the Management frame Trigger.

Figures 9E, 9F, 9G:
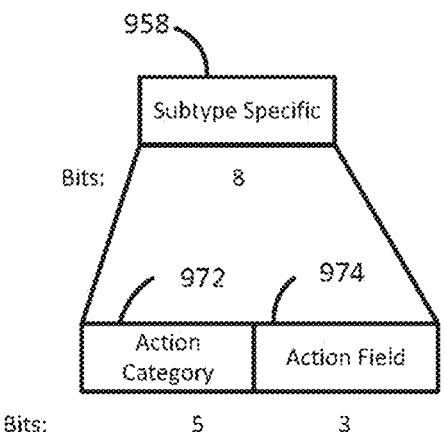
FIG. 9E illustrates a structure of the Subtype Specific subfield according to the first embodiment.
FIG. 9F illustrates a table showing description on the Action Category subfield according to the first embodiment.
FIG. 9G illustrates a table showing description on the Action Field sub filed according to the first embodiment.
Figures 11A, 11B, 11C:
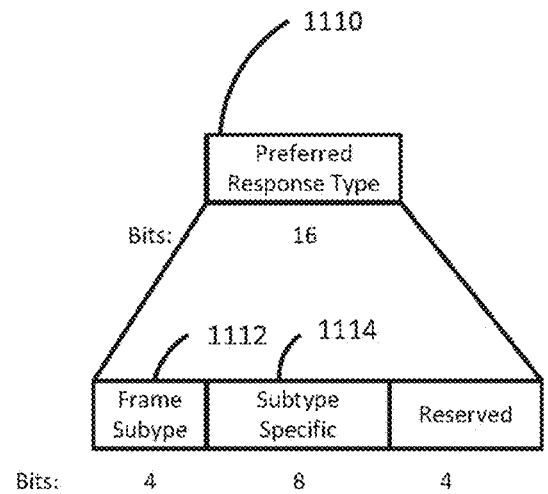
FIG. 11A illustrates a table showing description on various Trigger Types according to the second embodiment.
FIG. 11B illustrates a format of the Preferred Response Type subfield according to the second embodiment.
FIG. 11C illustrates a table showing description on the Frame Subtype according to the second embodiment.

FIG. 11B illustrates the structure of the two-octet long Preferred Response Type subfield 1100 proposed to be included in the Type-Dependent Common Info field 950 and it is used to further narrow down the specific Management frame preferred by the AP and contains a four-bit long Frame Subtype subfield 1112 and an eight-bit long Subtype Specific subfield 1114 while the remaining 4 bits are reserved. The Frame Subtype subfield 1112 indicates the Management frame Subtype being solicited and the same frame subtype encoding as that of the Subtype subfield defined for the Frame Control field in the IEEE 802.11 specification may be used. The encoding of the Subtype Specific subfield 1114 may differ for different Management frames and an example encoding when the Frame Subtype subfield 1112 indicates Management Action frames is shown in FIG. 9E.

Table 1140 in FIG. 11D shows an example encoding for the Action Field subfield 974 when the Action Category indicates 1 for QoS Action frame. The meaning of the values 0 to 6 are the same as defined in the relevant section of the IEEE 802.11 specification; e.g. 1 indicates ADDTS Response, 4 indicates QoS Map configure etc.

Figure 11E:
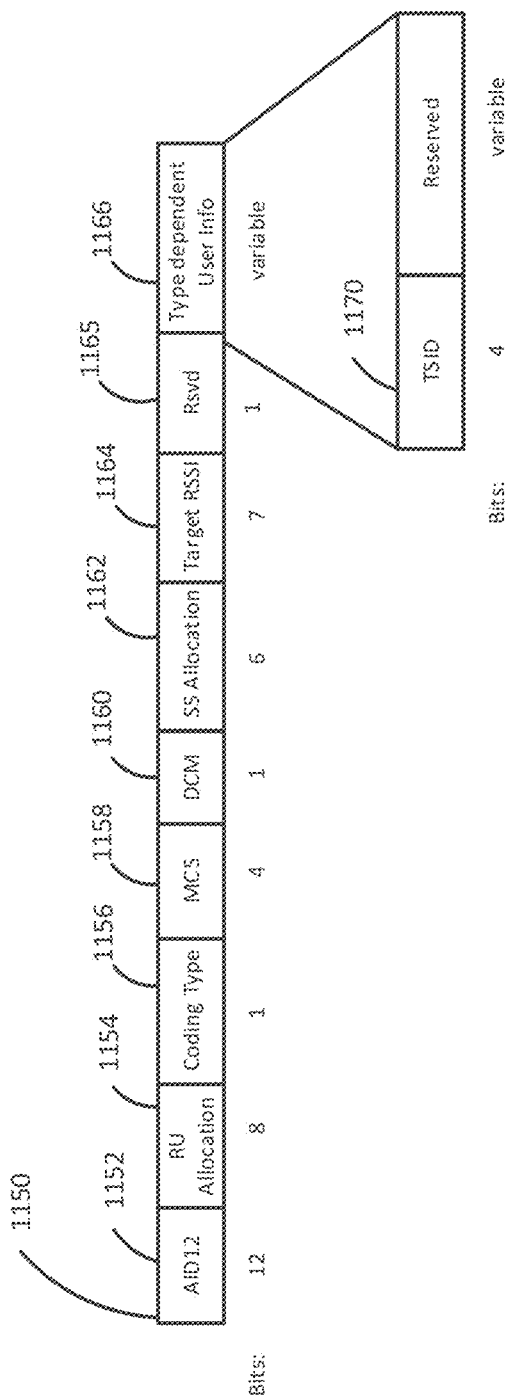
FIG. 11E illustrates a format of the User Info field according to the second embodiment.

FIG. 11E illustrates the structure 1150 of one of the User Info fields 912, ..., 914 and contains the following subfields:

An AID 12 subfield 1152 that carries the AID of the STA for which the User Info field is intended, An RU Allocation subfield 1154 that indicates the RU allocated to the STA identified by the User Identifier subfield 1152, A coding Type subfield 1156 that indicates the code type of uplink PPDU sent as a response by the STA identified by the User Identifier subfield 1152, An MCS subfield 1158 that indicates the MCS of the uplink PPDU sent as a response by the STA identified by the User Identifier subfield 1152, A DCM subfield 1160 that indicates whether Dual Carrier Modulation (DCM) is to be used by the uplink PPDU sent as a response by the STA identified by the User Identifier subfield 1152, An SS Allocation subfield 1162 that indicates the spatial streams of the uplink PPDU sent as a response by the STA identified by the User Identifier subfield 1152, A Target RSSI subfield 1164 that indicates the AP's expected RSSI for the uplink PPDU sent as a response by the STA identified by the User Identifier subfield 1152, A one bit Reserved field 1165, A Type dependent User Info subfield 1166 that indicates information specific to the STA identified by the User Identifier subfield 1152. As per the second embodiment, when the Trigger Type subfield 922 is set to a value that indicates the Management frame Trigger, the Type dependent User Info subfield 1166 carries user specific additional information pertinent to the Management frame exchange. As an example, when used during the exchange of ADDTS QoS Action frames, it can include the Traffic Stream ID (TSID) value or when used during the exchange of Block Ack Action frames, it can include the TID value; different User Info fields can carry different values.

Third Embodiment

As per the third embodiment, another method of carrying the TF Timeout is proposed. Instead of defining a new element, an existing element already carried by a management frame may be used by the AP to carry the TF Timeout.

An example in the case of Block Ack Action frames is illustrated in FIG. 12A. The TF Timeout is carried in the ADDBA Extension element 1200. The Element ID 1202 is set as specified by the 802.11 specification; the Length field 1204 indicates one octet, while the ADDBA Capabilities field 1206 is customized as illustrated in FIG. 12B. Aside from the existing No-Fragmentation subfield 1212, the remaining 7 bits are currently reserved. As per the third embodiment, some of the reserved bits, e.g. 6 bits are used to indicate the TF Timeout 1224 while the remaining 1 bit is reserved. The encoding of the TF Timeout is as detailed in table 1230 in FIG. 12C: a value of zero indicates that the TF Timeout is not set or it is used to reset a previously set TF Timeout, while values 1 to 63 indicate the timeout values of 1 to 63 TUs respectively. As compared to the first embodiment, the TF Timeout range that can be set by the method proposed in the second embodiment may be shorter, depending on how many bits are available in the existing elements to indicate the TF Timeout but even with the shorter range, the goal of protecting the AP's transmission can be fulfilled since in actual implementation the TF Timeout duration is not expected to be very large.

As per the third embodiment, another variant of the Trigger Frame is proposed, which is a variant of the Trigger Frame proposed in the first embodiment. FIG. 13A illustrates the structure of the two-octet long Preferred Response Type subfield 1300 proposed to be included in the Type-Dependent Common Info field 950 as per the third embodiment. The Preferred Response Type subfield 1300 contains a two-bit Frame Type subfield 1310, a four-bit TID/Frame Subtype subfield 1320 and an eight-bit Subtype Specific subfields 1330, while the remaining 2 bits are reserved.

Figure 13B:
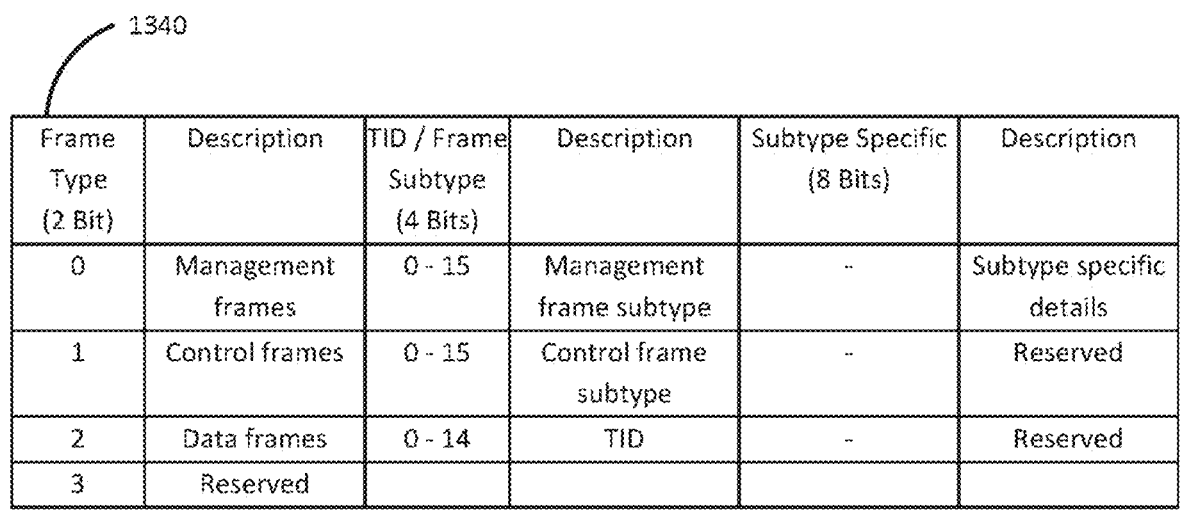
FIG. 13B illustrates a table showing description on various Frame Type values according to the third embodiment.

While the rest of the subfields are the same as defined in the first embodiment, the encoding of the Frame Type subfield 1310 is as detailed in Table 1340 in FIG. 13B and matches the definition of the Type subfield defined for the Frame Control field in the 802.11 specification. The TID/Frame Subtype subfield 1320 indicates the TID of the Data frame if the Frame Type subfield 1310 indicates a Data frame, the Management frame Subtype if the Frame Type subfield 1310 indicates a Management frame and the Control frame Subtype if the Frame Type subfield 1310 indicates a Control frame. The Subtype Specific subfield 1330 indicates further details regarding the frame type if the Frame Type subfield 1310 indicates a Management frame, else it is reserved for Data and Control frames. The encoding of the Subtype Specific subfield 1330 may differ for different Management frames and an example encoding when the Frame Subtype subfield 1320 indicates Management Action frames is shown in FIG. 9E.

Fourth Embodiment

As per the fourth embodiment, the AP includes one or more flags called the TF Flag, in the DL multi-user PPDU that initiates the multi-user management frame exchange, to indicate to the recipient STAs of the AP's intention to transmit, as the next frame following the DL multi-user PPDU, a Trigger frame allocating RUs to the STAs. The TF Flag may be carried in one of the Control subfields of the A-Control subfield of the HE Variant HT Control field 1000.

Figure 14:
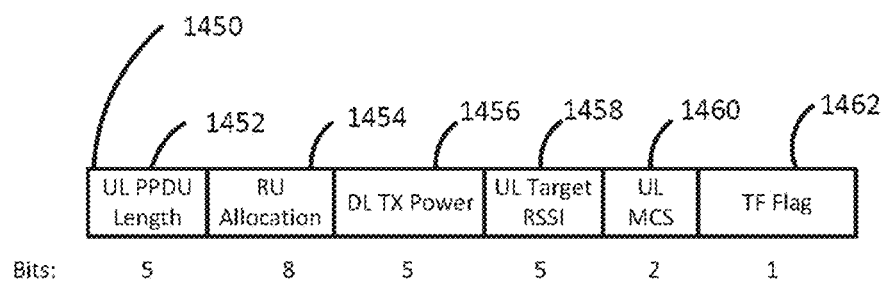
FIG. 14 is a diagram of the structure of the UL MU response scheduling Control subfield used to carry the TF timeout as used in the fourth embodiment.

FIG. 14 illustrates the structure of the Control subfield 1450 when the Control ID subfield is 0, in which case the Control information subfield carries scheduling information for an UL multi-user PPDU carrying the immediate acknowledgements to the frames containing the Control subfield. The Control subfield 1450 contains the following subfields:

An UL PPDU Length subfield 1452 that indicates the length of the uplink response PPDU.

An RU Allocation subfield 1454 that indicates the RU assigned for transmitting the uplink response PPDU.

A DL TX Power subfield 1456 that indicates the AP's transmit power.

An UL Target RSSI subfield 1458 that indicates the AP's target receive power.

An UL MCS subfield 1460 that indicates the MCS to be used for the uplink response PPDU.

A TF Flag 1462 proposed in the fourth embodiment that indicates the AP's intention to transmit, as the next frame following the frame that contains the Control Subfield 1450, a Trigger frame allocating RUs to the STAs to transmit the subsequent uplink response PPDU.

When the TF Flag 1462 is set to 1, it represents a transmit restriction and the STA that is the recipient of the frame carrying the TF Flag 1462 is restricted from transmitting anything on the medium, except an immediate acknowledgement frame, until it receives a Trigger frame from the AP allocating RUs to it or until the TXOP duration indicated by the frame carrying the TF Flag 1462 expires. In other words, as per the fourth embodiment, the TXOP duration indicated by the frame carrying the TF Flag 1462 acts as the implicit TF Timeout that was proposed in the other embodiments. If the STA fails to receive the Trigger frame, the STA may resume normal transmission once the TXOP expires.

Figure 15:
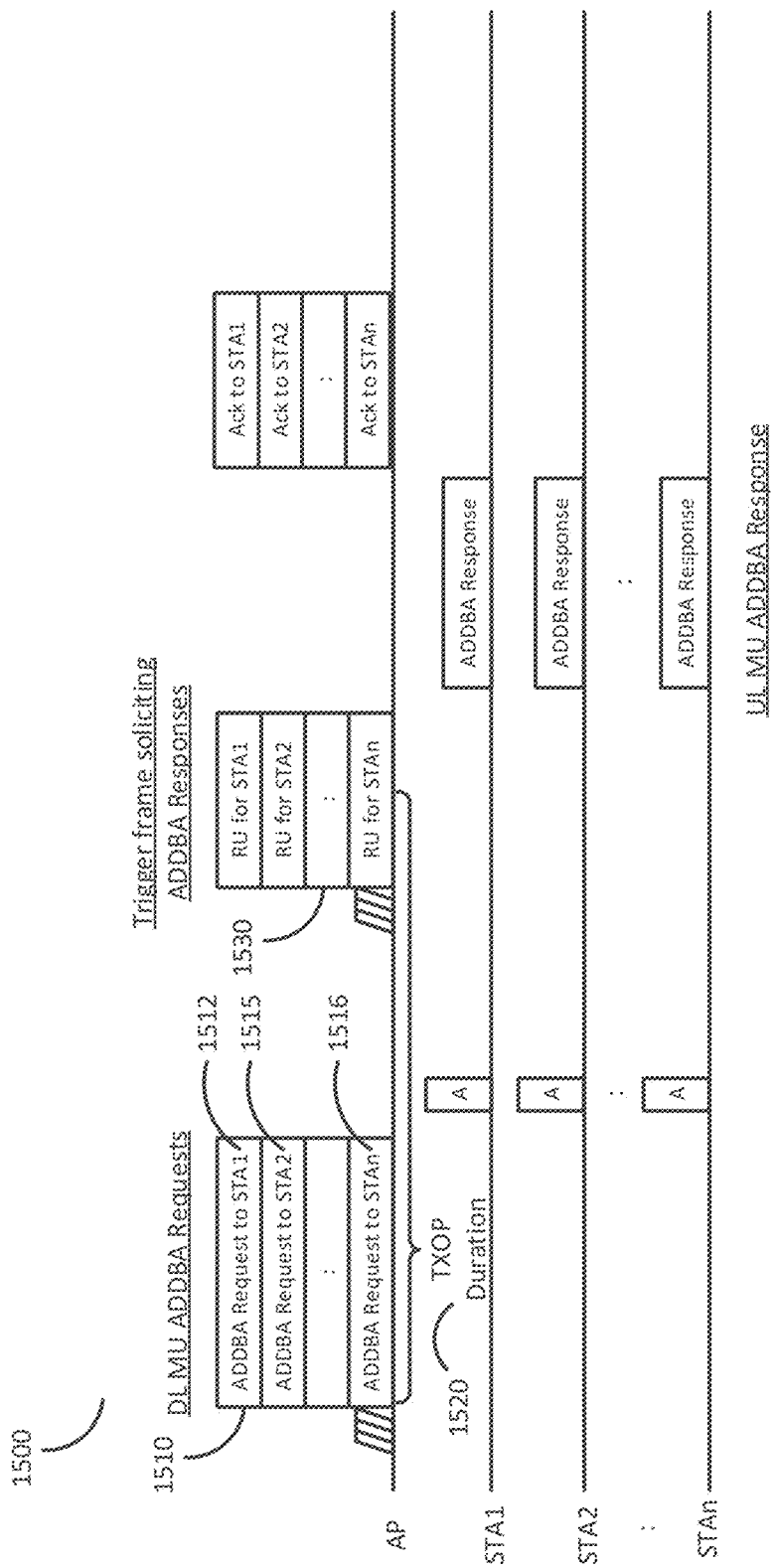
FIG. 15 is a diagram of an example multi-user management frame exchange initiated by the AP according to the fourth embodiment.

The frame exchange sequence 1500 in FIG. 15 illustrates an example of the multi-user management frame exchange as per the fourth embodiment. Management frame exchange for Block Ack Setup is taken as an example. The downlink multi-user PPDU 1510 carries multiple unicast ADDBA Request frames 1512, . . . , 1516 addressed to STAs STA1, STAn. Each ADDBA Request frame also carries a Control Subfield 1450 that allocates RU for the Ack frame to the ADDBA Request frame, with the TF Flag 1462 set to 1. The PPDU 1510 also sets the TXOP duration 1520 just long enough to cover the time at which the AP expects to transmit the Trigger frame 1530 that solicits the ADDBA Response frames from the STAs. The TXOP duration 1520 acts as protection for the Trigger frame 1520 against third party STAs. Since the TF Flags 1462 are set to 1, the STAs are restricted from transmitting the respective single user ADDBA Response frames until the Trigger frame 1530 is received.

Another alternative method to carry the TF Flag is to use one bit in the PHY header of the DL multi-user PPDU that initiates the multi-user management frame exchange, e.g. one bit in the common block field of the HE SIG-B. If the bit is set, the transmit restriction applies to all the STAs that have non-broadcast RUs allocated in the SIG-B user fields.

<Radio Communication System>

Figure 16:
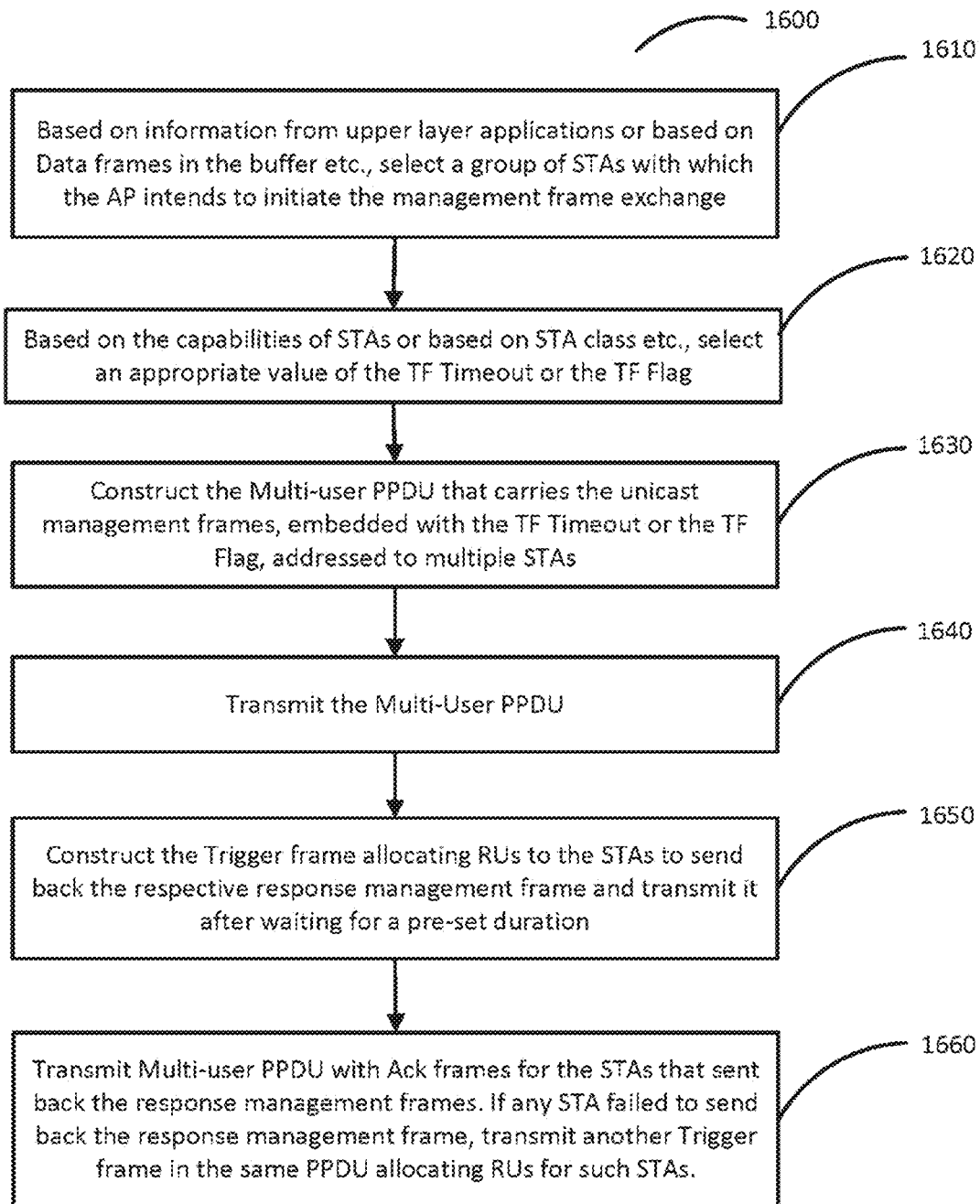
FIG. 16 is a flowchart of the operations carried out by the AP in order to initiate the multi-user management frame exchange according to the present disclosure.

FIG. 16 illustrates an example method 1600 to be implemented by an AP in order to facilitate multi-user Management frame exchange initiated by the AP. The example for the case of frame exchange initiated by the STAs is also similar and hence is not explained. At 1610, based on information from the upper layer applications, or based on existing Data frames in the AP's buffers etc., the AP selects a group of STAs with which the AP intends to initiate the Management frame exchange. The AP may also consider other factors, such as capabilities of the STAs during the selection of the group, e.g. grouping the high capability Class A STAs in one group and grouping the lower capability Class B STAs in another group etc.

At 1620, based on similar information, the AP also decides the value to be used for the TF Timeout, or an appropriate TXOP Duration to be used if the TF Flag method is used. At 1630, the AP constructs the multi-user PPDU to carry the unicast management frames and includes the TF Timeout or the TF Flag. At 1640, after contending for the medium, the AP transmits the multi-user PPDU. At 1650, the AP constructs the Trigger frame that allocates RUs to the STAs to send back the respective response management frames, and after waiting for an appropriate amount of time, the AP transmits the Trigger frame. At 1660, upon receiving the response management frames from the STA, the AP transmits a multi-user PPDU carrying the respective Ack frames. If any of the STA failed to send back the response management frame, the AP also includes, in the multi-user PPDU a broadcast or single/multiple unicast Trigger frames allocating RU for each of such STA. This step may be repeated as needed until the TXOP duration expires or once the AP receives response management frames from all the involved STAs.

Figure 17:
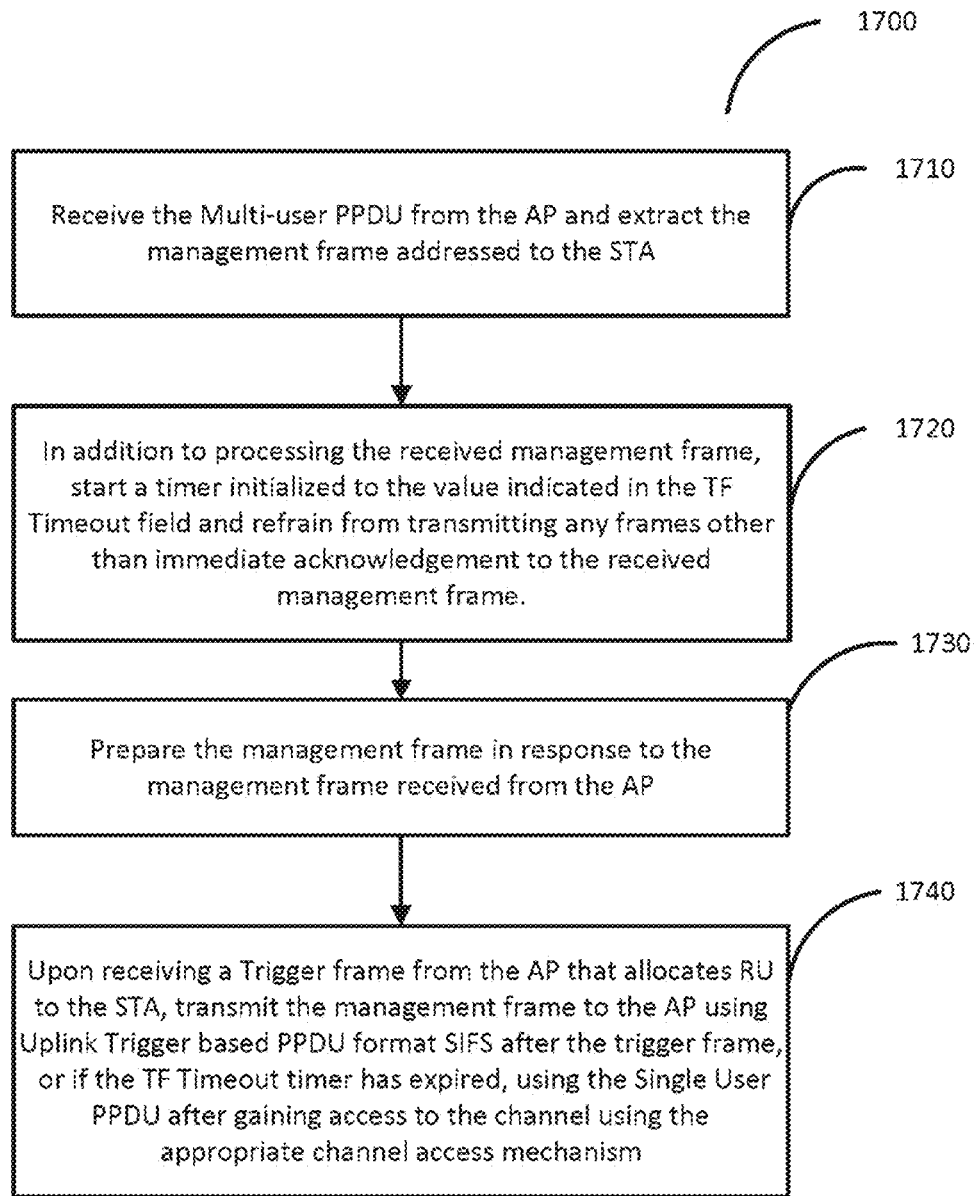
FIG. 17 is a flowchart of the operations carried out by the STAs in order to participate in the multi-user management frame exchange initiated by the AP according to the present disclosure.

FIG. 17 illustrates an example method 1700 to be implemented by an STA in order to participate in a multi-user Management frame exchange initiated by the AP. The example for the case of frame exchange initiated by the STAs is also similar and hence is not explained. At 1710, the STA receives the multi-user PPDU transmitted by the AP and based on the relevant information from the PHY header, extracts the management frame addressed to the STA. At 1720, aside from processing the received management frame, the STA also extracts either the TF Timeout field or the TF Flag and starts a timer that is initialized to either the TF Timeout duration, or if the TF Flag method is used, to the remaining TXOP duration. While the said timer is non-zero, the STA refrains from transmitting any frame other that immediate acknowledgment to the received management frame.

At 1730, the STA prepares the response management frame if it accepts the request from the AP and waits for the Trigger frame. At 1740, upon receiving the Trigger frame from the AP, the said timer is reset and the STA transmits the prepared response management frame on the RU allocated to the STA by the Trigger frame. If on the other hand, the said timer expires before the STA receives the Trigger frame from the AP, the transmit restriction is removed and the STA is free to contend and transmit the response management frame in the single user PPDU format.

<Configuration of an Access Point>

Figure 1:
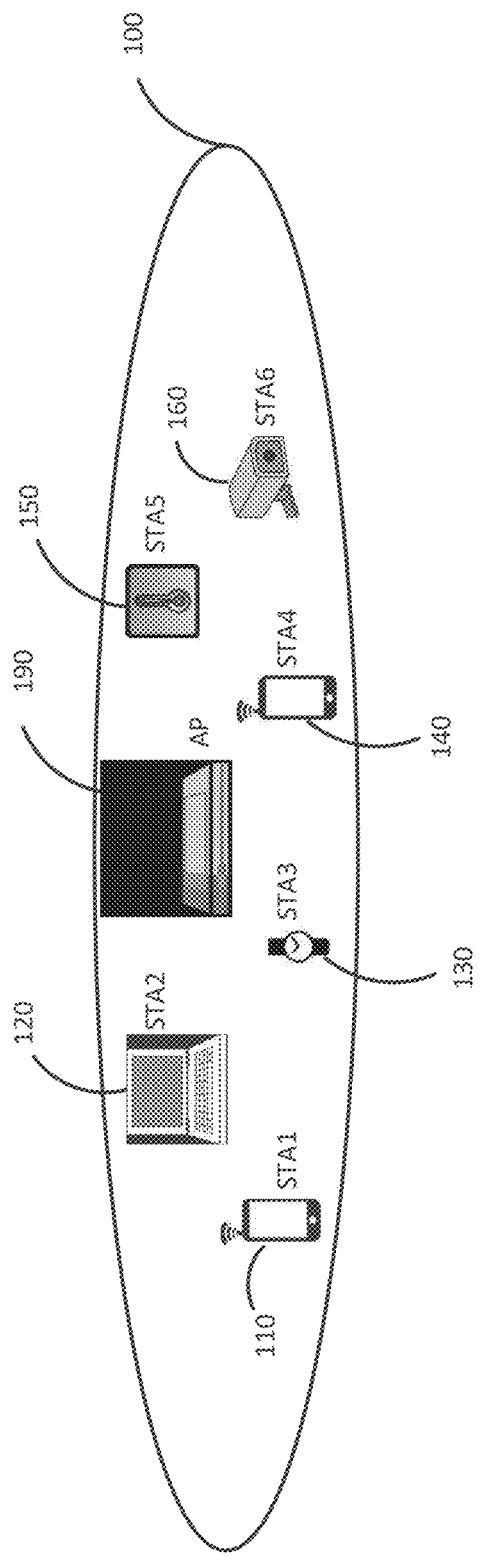
FIG. 1 is a diagram of a particular embodiment of a system that makes use of the multi-user management frame exchange.
Figure 18:
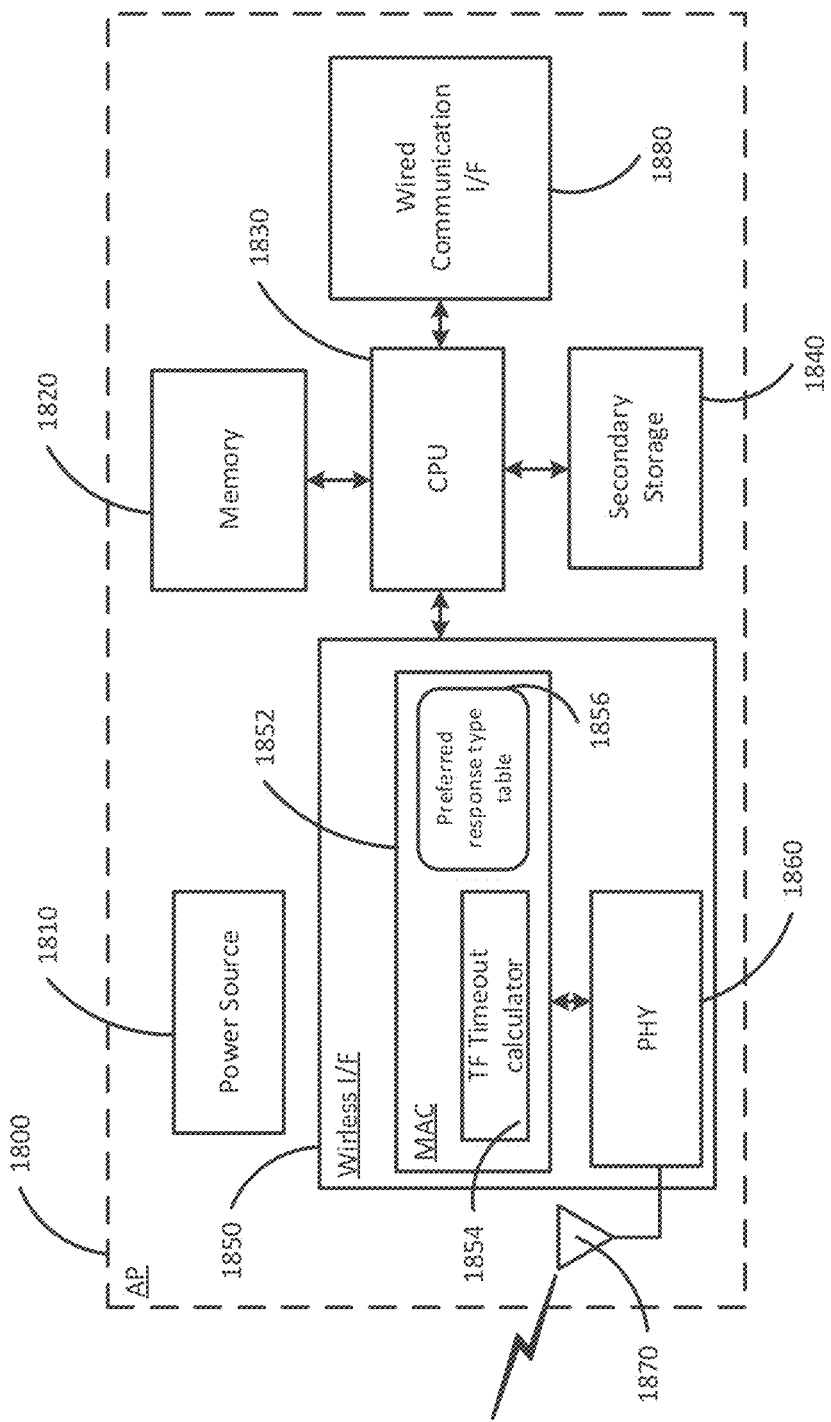
FIG. 18 is a block diagram of an example AP.

FIG. 18 is a block diagram of an example AP 1800, which may be the AP 190 in FIG. 1. The AP 1800 comprises a Central Processing Unit (CPU) 1830 coupled to a memory 1820, a secondary storage 1840, to one or more wireless communication interfaces 1850, as well as to other wired communication interfaces 1880. The secondary storage 1840 may be a non-volatile computer readable storage medium that is used to permanently store pertinent instruction codes, data etc. At the time of start up, the CPU 1830 may copy the instruction codes as well as related data to the volatile memory 1820 for execution. The instruction code may be an operating system, user applications, device drivers, execution codes etc. which are required for the operation of the AP 1800. The size of the instruction code and hence the storage capacity of both the secondary storage 1840 as well as the memory 1820 may be substantially bigger than that of the STA 1700.

The STA 1800 may also comprise a power source 1810 which in most cases may be a power mains but in some cases may also be some kind of high capacity battery for e.g. a car battery. The wired communication interface 1880 may be an ethernet interface, or a powerline interface, or a telephone line interface etc. The wireless communication interface 1850 may comprise an interface for cellular communication, or an interface for short range communication protocols such as Zigbee, or it may be a WLAN interface.

The Wireless interface 1850 may further comprise a MAC module 1852 and a PHY module 1860. The MAC module 1852 of an AP may be substantially more complicated than that of a STA 1900 and may comprise many sub-modules. Among other sub-modules, the MAC module 1852 may comprise a TF Timeout Calculator 1854 which is responsible for performing step 1620 of the method 1600. The MAC module 1852 may also store a table 1856 of the encoding used to represent the Preferred Response Type in a Trigger Frame. The PHY module is responsible for the conversion of the MAC module data to/from the transmission/reception signals. The wireless interface may also be coupled, via the PHY module, to one or more antennas 1870 that are responsible for the actual transmission/reception of the wireless communication signals on/from the wireless medium.

In a particular embodiment, the operating system comprises a Real Time Operating System (RTOS), the user application comprise a web browser or a smartphone app, device drivers comprises a WLAN driver and the execution code may comprise code which when executed by the CPU 1830, causes the method 1600 to be executed. Depending on the implementation, the Preferred Response Type encoding table 1856 may represent the Preferred Response Type encoding 960, or it may represent the Preferred Response Type encoding 1130, or it may represent the Preferred Response Type encoding 1340. The Preferred Response Type encoding table 1856 may be stored with default values during manufacturing but the AP 1800 may also tweak these if required according to the prevaling network conditions and communicate the new table contents to the member STAs for e.g. during the association process, or the AP 1800 may also choose to advertise the new table contents in an information element in some periodic frames such as beacon frames.

AP 1800 may comprise many other components that are not illustrated, for sake of clarity, in FIG. 18. Only those components that are most pertinent to the present disclosure are illustrated.

<Configuration of a STA>

Figure 19:
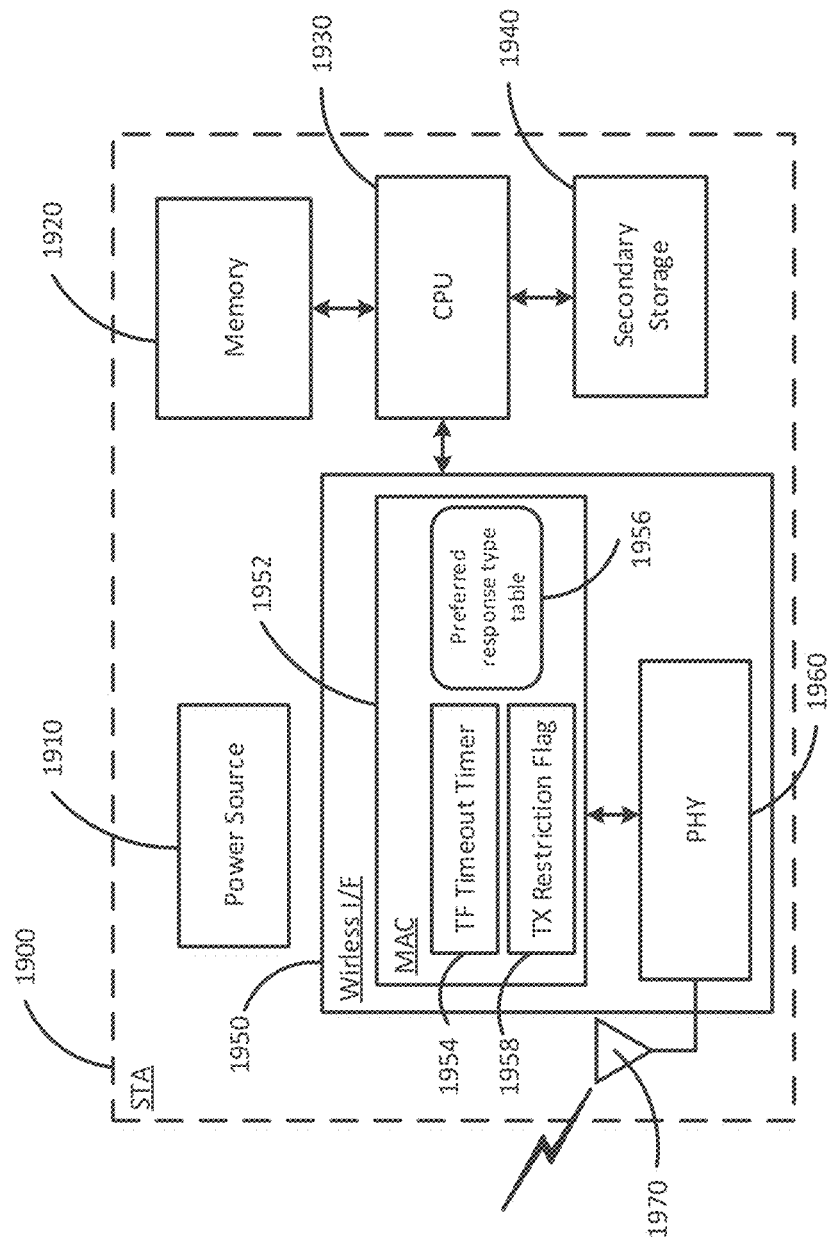
FIG. 19 is a block diagram of an example STA.

FIG. 19 is a block diagram of an example STA 1900, which may be any one of the STAs in FIG. 1. The STA 1900 comprises a Central Processing Unit (CPU) 1930 coupled to a memory 1920, a secondary storage 1940 and to one or more wireless communication interfaces 1950.

The secondary storage 1940 may be a non-volatile computer readable storage medium that is used to permanently store pertinent instruction codes, data etc. At the time of start up, the CPU 1930 may copy the instruction codes as well as related data to the volatile memory 1920 for execution. The instruction code may be an operating system, user applications, device drivers, execution codes etc. which are required for the operation of the STA 1900. The STA 1900 may also comprise a power source 1910 for example a lithium ion battery or a coin cell battery etc. The wireless communication interface 1950 may comprise an interface for cellular communication, or an interface for short range communication protocols such as Zigbee, or it may be a WLAN interface.

The Wireless interface 1950 may further comprise a MAC module 1952 and a PHY module 1960. Among other submodules, the MAC module 1952 may comprise a TF Timeout Timer 1954 to keep track of the transmit restriction period based on either the TF Timeout field, or the TXOP duration if the TF Flag method is used. The MAC module 1952 may maintain a TX Restriction Flag 1958 to record the transmit restriction status; when the flag is set, the STA refrains from transmitting frames other than immediate acknowledgments. The MAC module 1952 may also store a table 1956 of the bit encoding used to represent the Preferred Response Type encoding. The PHY module is responsible for the conversion of the MAC module data to/from the transmission/reception signals. The wireless interface may also be coupled, via the PHY module, to one or more antennas 1970 that are responsible for the actual transmission/reception of the wireless communication signals on/from the wireless medium.

In a particular embodiment, the operating system comprises a Real Time Operating System (RTOS), the user application comprise a web browser or a smartphone app, device drivers comprises a WLAN driver and the execution code may comprise code which when executed by the CPU 1930, causes the method 1700 to be executed. The TF Timeout timer 1954 is used in 1720 to keep track of the TF Timeout. Depending on the implementation, the Preferred Response Type encoding table 1956 may represent the Preferred Response Type encoding 960, or it may represent the Preferred Response Type encoding 1130, or it may represent the Preferred Response Type encoding 1340. The Preferred Response Type encoding table 1956 may be stored with default values during manufacturing. It is also possible that the Preferred Response Type encoding table 1956 be updated according to the values communicated by the AP during the association process, or based on the values advertised regularly by the AP in periodic frames such as beacon frames.

STA 1900 may comprise many other components that are not illustrated, for sake of clarity, in FIG. 19. Only those components that are most pertinent to the present disclosure are illustrated.

In the foregoing embodiments, the present disclosure is configured with hardware by way of example, but may also be provided by software in cooperation with hardware.

In addition, the functional blocks used in the descriptions of the embodiments are typically implemented as LSI devices, which are integrated circuits. The functional blocks may be formed as individual chips, or a part or all of the functional blocks may be integrated into a single chip. The term "LSI" is used herein, but the terms "IC," "system LSI," "super LSI" or "ultra LSI" may be used as well depending on the level of integration.

In addition, the circuit integration is not limited to LSI and may be achieved by dedicated circuitry or a general-purpose processor other than an LSI. After fabrication of LSI, a field programmable gate array (FPGA), which is programmable, or a reconfigurable processor which allows reconfiguration of connections and settings of circuit cells in LSI may be used.

Should a circuit integration technology replacing LSI appear as a result of advancements in semiconductor technology or other technologies derived from the technology, the functional blocks could be integrated using such a technology. Another possibility is the application of biotechnology and/or the like.

INDUSTRIAL APPLICABILITY

This disclosure can be used to enable the exchange of management frames between multiple wireless devices in an efficient manner.

REFERENCE SIGNS LIST

100 Wireless Network
110, 120, 130, 140, 150, 160, 1900 STA
190, 1800 AP
1810, 1910 Power Source
1820, 1920 Memory
1830, 1930 CPU
1840, 1940 Secondary Storage
1850, 1950 Wireless interface
1852, 1952 MAC module
1854 TF Timeout calculator
1856, 1956 Preferred response type table
1860, 1960 PHY module
1870, 1970 Antennas
1880 Wired communication interface
1954 T F Timeout Timer
1958 T X Restriction Flag

The invention claimed is:

1. A transmission apparatus, comprising:
a transmitter, which, in operation, transmits, to a station, a management frame that contains an element indicating a duration of a time period and a trigger frame flag indicating whether the transmitter attempts to transmit a trigger frame during the time period, and upon winning contention performed within the duration of the time period, the transmitter transmits the trigger frame to the station, wherein the duration of the time period for contention is set, by the transmission apparatus, based on a capability of the station; and a receiver, which, in operation, receives, from the station, uplink data in response to the trigger frame, when the transmitter transmits the trigger frame.

2. The transmission apparatus according to claim 1, wherein the trigger frame flag indicates that a next frame of the management frame is the trigger frame.

3. The transmission apparatus according to claim 1, wherein the management frame is a broadcast management frame.

4. The transmission apparatus according to claim 1, wherein the trigger frame solicits the uplink data from a plurality of stations, and the trigger frame indicates a transmission restriction duration during which other stations are not allowed to transmit while trigger-based communication initiated by the trigger frame is in progress.

5. The transmission apparatus according to claim 1, wherein the transmitter transmits, to a plurality of stations, information indicating the time period.

6. A transmission method implemented by a transmission apparatus, the transmission method comprising:

transmitting, to a station, a management frame that contains an element indicating a duration of a time period and a trigger frame flag indicating whether the transmission apparatus attempts to transmit a trigger frame during the time period;

upon winning contention performed by the transmission apparatus within the duration of the time period, transmitting the trigger frame to the station, wherein the duration of the time period for contention is set, by the transmission apparatus, based on a capability of the station; and receiving, from the station, uplink data in response to the trigger frame, when the trigger frame is transmitted.

* * * * *